(12) United States Patent
Lee

(10) Patent No.: US 9,713,912 B2
(45) Date of Patent: Jul. 25, 2017

(54) FEATURES FOR MITIGATING THERMAL OR MECHANICAL STRESS ON AN ENVIRONMENTAL BARRIER COATING

(75) Inventor: Kang N. Lee, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1078 days.

(21) Appl. No.: 13/521,647

(22) PCT Filed: Jan. 11, 2011

(86) PCT No.: PCT/US2011/020849
§ 371 (c)(1),
(2), (4) Date: Jan. 18, 2013

(87) PCT Pub. No.: WO2011/085376
PCT Pub. Date: Jul. 14, 2011

(65) Prior Publication Data
US 2013/0122259 A1    May 16, 2013

Related U.S. Application Data

(60) Provisional application No. 61/382,268, filed on Sep. 13, 2010, provisional application No. 61/293,930, filed on Jan. 11, 2010.

(51) Int. Cl.
*B32B 3/30*     (2006.01)
*C23C 30/00*    (2006.01)
(Continued)

(52) U.S. Cl.
CPC .............. *B32B 3/30* (2013.01); *C04B 41/009* (2013.01); *C04B 41/5024* (2013.01);
(Continued)

(58) Field of Classification Search
CPC . B32B 3/00; B32B 3/30; F01D 11/122; F01D 5/288; C23C 30/00; C23C 28/00;
(Continued)

(56) References Cited

U.S. PATENT DOCUMENTS 1,335,002 A    3/1920    Johnson
2,564,497 A    8/1951    Navias
(Continued)

FOREIGN PATENT DOCUMENTS

CA    2525283 A1    5/2006
DE    4341216 A1    6/1995
(Continued)

OTHER PUBLICATIONS

U.S. Appl. No. 14/212,568, by Andrew J. Lazur et al., filed Mar. 14, 2014.
(Continued)

*Primary Examiner* — Catherine A Simone
(74) *Attorney, Agent, or Firm* — Shumaker & Sieffert, P.A.

(57) ABSTRACT

An article may include a substrate comprising a matrix material and a reinforcement material, a layer formed on the substrate, an array of features formed on the layer, and a coating formed on the layer and the array of features. The article may have improved thermal and/or mechanical stress tolerance compared to an article not including the array of features formed on the layer.

30 Claims, 10 Drawing Sheets

(51) Int. Cl.

| | | |
|---|---|---|
| *F01D 5/28* | (2006.01) | |
| *F01D 11/12* | (2006.01) | |
| *C23C 28/04* | (2006.01) | |
| *C23C 28/00* | (2006.01) | |
| *C04B 41/87* | (2006.01) | |
| *C04B 41/89* | (2006.01) | |
| *C04B 41/00* | (2006.01) | |
| *C04B 41/50* | (2006.01) | |
| *C04B 41/52* | (2006.01) | |
| *C23C 4/02* | (2006.01) | |
| *C23C 4/18* | (2006.01) | |
| *C23C 4/073* | (2016.01) | |

(52) U.S. Cl.
CPC .............. *C04B 41/52* (2013.01); *C04B 41/87* (2013.01); *C04B 41/89* (2013.01); *C23C 4/02* (2013.01); *C23C 4/073* (2016.01); *C23C 4/18* (2013.01); *C23C 28/042* (2013.01); *C23C 28/048* (2013.01); *C23C 28/3215* (2013.01); *C23C 28/3455* (2013.01); *C23C 28/42* (2013.01); *C23C 30/00* (2013.01); *F01D 5/288* (2013.01); *F01D 11/122* (2013.01); *F05D 2230/13* (2013.01); *F05D 2300/21* (2013.01); *Y02T 50/672* (2013.01); *Y02T 50/673* (2013.01); *Y10T 428/24521* (2015.01); *Y10T 428/24545* (2015.01)

(58) Field of Classification Search
CPC ..... C23C 28/042; C23C 28/048; C23C 28/42; Y10T 428/24521; Y10T 428/24545
USPC .......... 428/156, 167, 161, 164; 427/258, 269
See application file for complete search history.

(56) References Cited

U.S. PATENT DOCUMENTS

| | | |
|---|---|---|
| 2,686,654 A | 8/1954 | Roush |
| 4,277,522 A | 7/1981 | Dorfeld |
| 4,289,447 A | 9/1981 | Sterman et al. |
| 4,390,320 A | 6/1983 | Eiswerth |
| 4,589,823 A | 5/1986 | Koffel |
| 4,682,933 A | 7/1987 | Wagner |
| 5,030,060 A | 7/1991 | Liang |
| 5,124,006 A | 6/1992 | Fayeulle et al. |
| 5,223,332 A | 6/1993 | Quets |
| 5,264,011 A | 11/1993 | Brown et al. |
| 5,320,879 A | 6/1994 | Bullock |
| 5,368,911 A | 11/1994 | Mannava et al. |
| 5,419,971 A | 5/1995 | Skelly et al. |
| 5,435,889 A | 7/1995 | Dietrich |
| 5,460,002 A | 10/1995 | Correa |
| 5,476,363 A | 12/1995 | Freling et al. |
| 5,520,516 A | 5/1996 | Taylor et al. |
| 5,558,922 A | 9/1996 | Gupta et al. |
| 5,621,968 A | 4/1997 | Kikkawa et al. |
| 5,756,217 A | 5/1998 | Schroder et al. |
| 5,830,586 A | 11/1998 | Gray et al. |
| 5,866,271 A | 2/1999 | Stueber et al. |
| 5,985,205 A | 11/1999 | Atmur et al. |
| 5,993,976 A | 11/1999 | Sahoo et al. |
| 5,993,980 A | 11/1999 | Schmitz et al. |
| 5,997,251 A | 12/1999 | Lee |
| 6,027,306 A | 2/2000 | Bunker |
| 6,074,706 A | 6/2000 | Beverley et al. |
| 6,190,124 B1 | 2/2001 | Freling et al. |
| 6,224,963 B1 | 5/2001 | Strangman |
| 6,251,526 B1 | 6/2001 | Staub |
| 6,316,078 B1 | 11/2001 | Smialek |
| 6,382,920 B1 | 5/2002 | Dopper |
| 6,461,107 B1 | 10/2002 | Lee et al. |
| 6,461,108 B1 | 10/2002 | Lee et al. |
| 6,471,881 B1 | 10/2002 | Chai et al. |
| 6,475,316 B1 | 11/2002 | Kirk et al. |
| 6,503,574 B1 | 1/2003 | Skelly et al. |
| 6,511,762 B1 | 1/2003 | Lee et al. |
| 6,526,756 B2 | 3/2003 | Johnson et al. |
| 6,551,061 B2 | 4/2003 | Darolia et al. |
| 6,716,539 B2 | 4/2004 | Subramanian |
| 6,720,087 B2 | 4/2004 | Fried et al. |
| 6,727,005 B2 | 4/2004 | Gimondo et al. |
| 7,220,458 B2 | 5/2007 | Hollis et al. |
| 7,229,253 B2 | 6/2007 | Broderick et al. |
| 7,291,403 B2 | 11/2007 | Nagaraj et al. |
| 7,544,043 B2 | 6/2009 | Eastman et al. |
| 7,704,596 B2 | 4/2010 | Merrill et al. |
| 2001/0004436 A1 | 6/2001 | Chasripoor et al. |
| 2002/0146541 A1 | 10/2002 | Fried |
| 2003/0059309 A1 | 3/2003 | Szucs et al. |
| 2003/0101587 A1 | 6/2003 | Rigney et al. |
| 2003/0170120 A1 | 9/2003 | Grunke et al. |
| 2003/0203224 A1 | 10/2003 | DiConza et al. |
| 2004/0175597 A1 | 9/2004 | Litton et al. |
| 2005/0064146 A1 | 3/2005 | Hollis et al. |
| 2005/0238488 A1 | 10/2005 | Eastman et al. |
| 2006/0128548 A1* | 6/2006 | Carper ................ C03C 8/16 501/17 |
| 2006/0151856 A1 | 7/2006 | Torigoe et al. |
| 2007/0087211 A1 | 4/2007 | Endres |
| 2007/0253817 A1 | 11/2007 | Bezencon et al. |
| 2007/0274837 A1 | 11/2007 | Taylor et al. |
| 2008/0085191 A1 | 4/2008 | Liang |
| 2008/0145629 A1 | 6/2008 | Anoshkina et al. |
| 2009/0017260 A1 | 1/2009 | Kulkarni et al. |
| 2009/0175571 A1 | 7/2009 | Boehm et al. |
| 2009/0324401 A1 | 12/2009 | Calla |
| 2010/0015399 A1 | 1/2010 | Coupland et al. |
| 2010/0047512 A1 | 2/2010 | Morrison et al. |
| 2010/0159151 A1* | 6/2010 | Kirby ................ C04B 41/009 427/452 |
| 2010/0166566 A1 | 7/2010 | Hatman |
| 2010/0272953 A1 | 10/2010 | Yankowich et al. |
| 2011/0014060 A1 | 1/2011 | Bolcavage et al. |
| 2011/0097538 A1 | 4/2011 | Bolcavage et al. |
| 2012/0230818 A1 | 9/2012 | Shepherd et al. |
| 2013/0122259 A1 | 5/2013 | Lee |
| 2014/0272310 A1 | 9/2014 | Lazur et al. |

FOREIGN PATENT DOCUMENTS

| | | |
|---|---|---|
| DE | 19619438 A1 | 11/1997 |
| DE | 19824583 A1 | 12/1999 |
| DE | 102005050873 A1 | 4/2007 |
| EP | 0575685 A1 | 12/1993 |
| EP | 0661415 A1 | 7/1995 |
| EP | 0712940 A1 | 5/1996 |
| EP | 0935009 A1 | 8/1999 |
| EP | 1228898 A1 | 8/2002 |
| GB | 2155558 A | 9/1985 |
| JP | 07003424 A | 1/1995 |
| WO | 9633837 A1 | 10/1996 |
| WO | WO 0159262 A1 | 8/2001 |
| WO | 2007087989 A1 | 8/2007 |
| WO | WO 2009091721 A2 | 7/2009 |
| WO | WO 2009126194 A1 | 10/2009 |
| WO | 2010000795 A1 | 1/2010 |
| WO | 2013033323 A1 | 3/2013 |

OTHER PUBLICATIONS

Office Action from U.S. Appl. No. 12/837,024, dated Jan. 15, 2015, 14 pp.

Final Notification of Reason for Rejection from counterpart Japanese Patent Application No. 2012-549002, dated Jan. 23, 2015, 4 pp.

Office Action from U.S. Appl. No. 12/837,024, dated Jan. 17, 2013, 17 pp.

Office Action from U.S. Appl. No. 12/837,024, dated Jul. 17, 2013, 16 pp.

Response to Office Action dated May 9, 2013, from U.S. Appl. No. 12/837,051, filed Aug. 7, 2013, 15 pp.

(56) References Cited

OTHER PUBLICATIONS

Response to Office Action dated Dec. 5, 2012, from U.S. Appl. No. 12/837,051, filed Mar. 5, 2013, 16 pp.
Response to Office Action dated Jan. 17, 2013, from U.S. Appl. No. 12/837,024, filed Apr. 16, 2013, 12 pp.
Inghram et al., Flame Spray Handbook, Metro Inc., vol. 1, 27 pages, 1964.
Nissley et al., "Thermal Barrier Coating Life Modeling in Aircraft Gas Turbine Engines," Journal of Thermal Spray Technology, vol. 6, edition 1, Mar. 1997, pp. 91-98.
Office Action from U.S. Appl. No. 12/837,051, dated May 9, 2013, 14 pp.
Amendment in Response to the Examiner's Answer to Appellant's Appeal Brief mailed Oct. 6, 2014, from U.S. Patent Appl. No. 12/837,024, filed Dec. 3, 2014, 11 pp.
Office Action from U.S. Appl. No. 12/837,051, dated Nov. 26, 2013, 12 pp.
Office Action from U.S. Appl. No. 12/837,024, dated Jan. 29, 2014, 16 pp.
Response to Office Action mailed Nov. 26, 2013, from U.S. Appl. No. 12/837,051, filed Feb. 26, 2014, 16 pp.
Amendment in Response to Office Action mailed Jan. 15, 2015, from U.S. Appl. No. 12/837,024, filed Apr. 15, 2015, 16 pp.
Office Action from Japanese counterpart application No. 2012-549002, dated May 12, 2014, 4 pp.
Notice of Allowance from U.S. Appl. No. 12/837,051, mailed Jun. 6, 2014, 17 pp.
Response to Office Action dated Jul. 17, 2013, from U.S. Appl. No. 12/837,024, filed Oct. 17, 2013, 16 pp.
U.S. Appl. No. 12/837,024, mailed Jul. 16, 2015, 15 pp.
International Search Report and Written Opinion from international application No. PCT/US2011/020849, dated Mar. 14, 2011, 10 pp.
International Preliminary Report on Patentability from international application No. PCT/US2011/020849, dated Jul. 26, 2012, 7 pp.
Notice of Appeal for U.S. Appl. No. 12/837,024, filed Apr. 2, 2014, 1 pp.
Office Action from U.S. Appl. No. 12/837,051, dated Dec. 5, 2012, 9 pp.
Examiner's Answer from U.S. Appl. No. 12/837,024, dated Oct. 3, 2014, 11 pp.
Examination Report from counterpart European Application No. 11700312.9, dated Jan. 31, 2017, 4 pp.
Response to Examination Report from counterpart European Application No. 11700312.9, dated Jan. 31, 2017, filed May 15, 2017, 94 pp.

\* cited by examiner

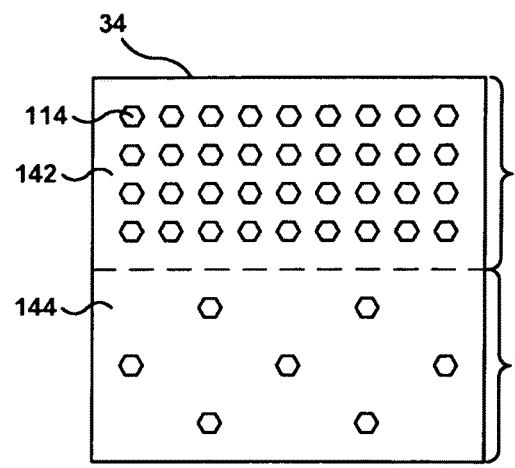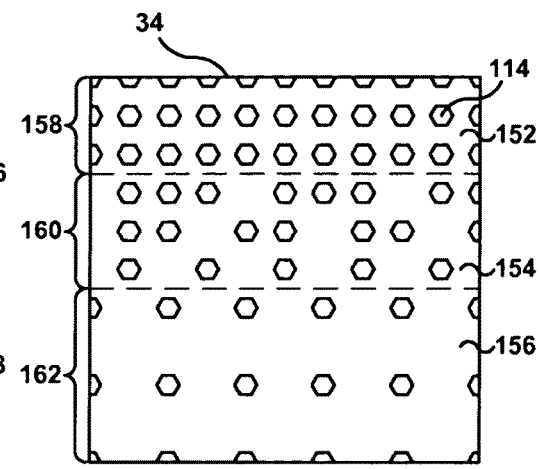
FIG. 9A    FIG. 9B
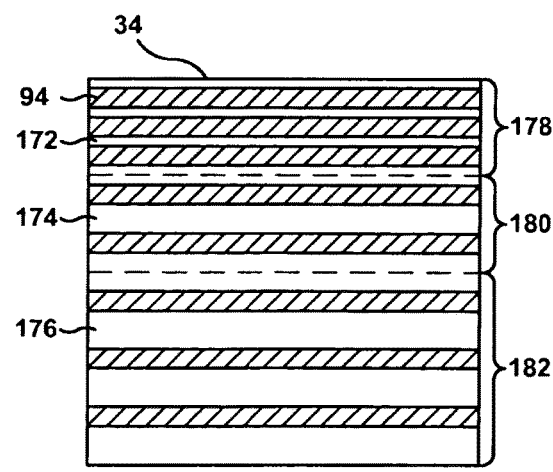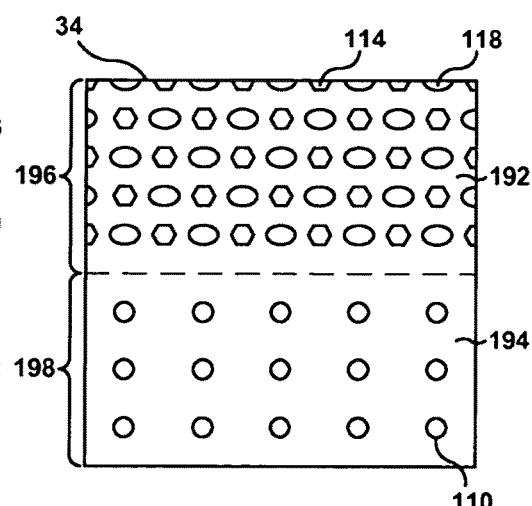
FIG. 9C    FIG. 9D

FEATURES FOR MITIGATING THERMAL OR MECHANICAL STRESS ON AN ENVIRONMENTAL BARRIER COATING

This application is a national stage entry under 35 U.S.C. §371 of PCT Application No. PCT/US2011/020849, filed Jan. 11, 2011, which claims the benefit of U.S. Provisional Application No. 61/293,930, filed Jan. 11, 2010 and U.S. Provisional Application No. 61/382,268, filed Sep. 13, 2010, the entire contents of each are incorporated herein by reference.

TECHNICAL FIELD

The disclosure is directed to techniques for mitigating thermal stress experienced by an article coated with an environmental barrier coating.

BACKGROUND

The components of high-temperature mechanical systems, such as, for example, gas-turbine engines, must operate in severe environments. For example, the combustor liners exposed to hot gases in commercial aeronautical engines typically experience coating surface temperatures of up to about 1150° C. to about 1400° C.

Some components of high-temperature mechanical systems include a ceramic or ceramic matrix composite (CMC)-based substrate. The substrate can be coated with an environmental barrier coating (EBC) to reduce exposure of a surface of the substrate to environmental species, such as water vapor or oxygen. The environmental barrier coating may include a ceramic topcoat, and may be bonded to the substrate by an underlying metallic or ceramic bond coat.

The component may be exposed to widely different temperatures during operation and when operation is ceased. These widely different temperatures may cause significant thermal stress to the EBC, which eventually may lead to spallation of the EBC from the substrate. The stress may be due to, for example, the substrate/bond coat and EBC having different coefficients of thermal expansion, or the substrate/bond coat and EBC experiencing different temperatures due to thermal gradients

SUMMARY

In general, the present disclosure is directed to techniques for mitigating thermal and/or mechanical stress in an article comprising a ceramic or ceramic matrix composite (CMC) coated with an environmental barrier coating (EBC). Mitigating thermal and/or mechanical stress may increase a useful life of the EBC (e.g., a life of the EBC before the article coated with the EBC is retired or refurbished to repair the EBC). In some embodiments, the EBC is bonded to the substrate by a bond coat. In other embodiments, the EBC may be formed directly on the substrate. In some cases, the substrate/bond coat and the EBC may have different coefficients of thermal expansion and thus undergo different amounts of thermal expansion and/or contraction when a temperature of the article changes. In addition, because the EBC provides some thermal insulation to the substrate, the substrate and EBC may experience different temperatures, which may affect the relative amounts of expansion and/or contraction experienced by the substrate and EBC. This may lead to thermal stress at or above the bond coat/EBC interface, which over time may lead to crack formation and growth in the EBC. An external load, for example, due to impact of debris with the EBC may lead to mechanical stress and result in crack formation in the EBC. Eventually, if the crack grows to a sufficient size, the EBC may detach from the substrate.

Regardless of what the crack is caused by, detachment of the EBC from the substrate may leave an area of the substrate or bond coat exposed to environmental species, such as water vapor or oxygen, which may be harmful to the substrate or bond coat. The present disclosure provides techniques for mitigating crack propagation and detachment of the EBC from the substrate or bond coat.

In one aspect, the disclosure is directed to an article comprising a substrate including a matrix material and a reinforcement material, a layer formed on the substrate, an array of features formed on the layer, and an environmental barrier coating formed on the layer and the array of features.

In another aspect, the disclosure is directed to an article including a substrate comprising a matrix material and a reinforcement material. The article also includes a layer formed on the substrate, a first array of features formed on the layer at a first location, and a second array of features formed on the layer at a second location. According to this aspect of the disclosure, the first array comprises a first pattern and the second array comprises a second pattern different than the first pattern. The article also includes an environmental barrier coating formed on the substrate, the first array of features, and the second array of features.

In a further aspect, the disclosure is directed to a method including forming a layer on a substrate, forming an array of features on a surface of the layer, and forming an environmental barrier coating on the layer and the array of features. According to this aspect of the disclosure, the substrate comprises a matrix material and a reinforcement material.

In an additional aspect, the disclosure is directed to a method including forming a layer on a substrate. The substrate may include a matrix material and a reinforcement material. In this aspect of the disclosure, the method further includes forming a first array of features on a surface of the layer in a first location and forming a second array of features on the surface of the layer at a second location. The first array of features may comprise a first pattern and the second array of features may comprise a second pattern different than the first pattern. According to this aspect of the disclosure, the method further includes forming an environmental barrier coating over the layer, the first array of features, and the second array of features.

The details of one or more examples are set forth in the accompanying drawings and the description below. Other features, objects, and advantages will be apparent from the description and drawings, and from the claims.

BRIEF DESCRIPTION OF DRAWINGS

FIGS. 9A-9D are conceptual diagrams of exemplary layers in which first and second arrays of features are formed in first and second locations of the substrate, respectively.

DETAILED DESCRIPTION

Figure 1:
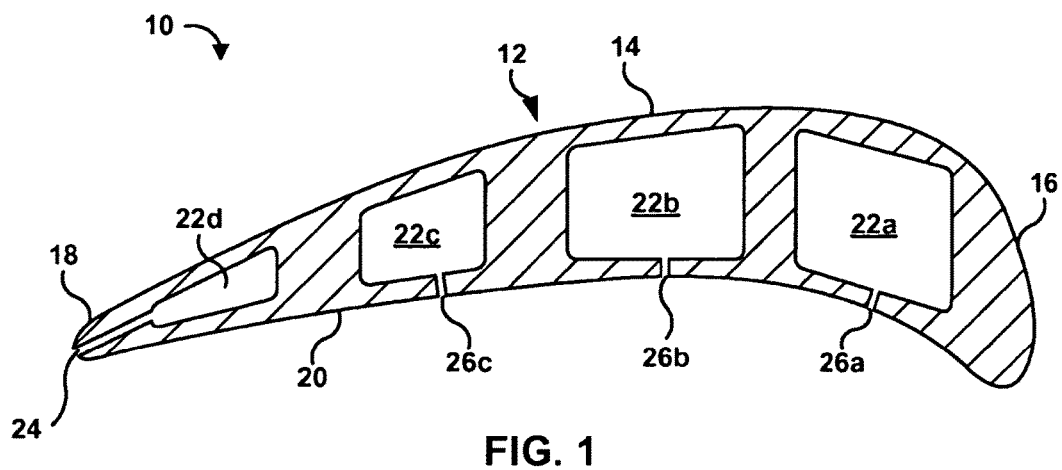
FIG. 1 is a cross-sectional diagram of an example of a gas turbine engine turbine blade.

In general, the present disclosure is directed to techniques for mitigating thermal and/or mechanical stress in an article coated with an environmental barrier coating (EBC). In some embodiments, the techniques described herein may increase the life span of the EBC. As described above, an article, such as a gas turbine engine blade, may experience widely varying temperatures during use. These changes in temperature may lead to thermal stress at an interface between two layers having different coefficients of thermal expansion and/or two layers experiencing different temperatures due to thermal gradients. For example, an article may be coated with a bond coat formed on the substrate and an EBC formed on the bond coat. In some embodiments, the substrate/bond coat and the EBC may have different coefficients of thermal expansion and thus undergo different amounts of thermal expansion and/or contraction when a temperature of the article changes. Additionally or alternatively, the EBC may provide some thermal insulation to the substrate/bond coat, which may result in the EBC and the substrate/bond coat experiencing different temperatures. This may lead to thermal stress at or above the interface of the bond coat and EBC or substrate and EBC, which over time may lead to crack formation and growth in the EBC. Eventually, when the crack grows to a sufficient size, a portion of the EBC may detach from the substrate/bond coat. This may leave an area of the substrate or bond coat exposed to environmental species, such as water vapor, which may be harmful to the substrate or bond coat. In some embodiments, the EBC may be impacted by debris, which may damage the EBC and cause cracks to from in the EBC. This may also lead to delamination of the EBC from the substrate/bond coat and exposure of the substrate/bond coat to environmental species, such as water vapor.

Disclosed herein are techniques for reducing or minimizing the effect of crack growth in the EBC. The techniques include forming features in a surface of a layer formed on the substrate, such as an overlay or a bond coat. The features disrupt the relative planarity of the surface and impede crack growth or propagation. In particular, when a crack forms in the EBC and begins to propagate in a plane substantially parallel to the surface of the substrate, the features serve as an impediment to further crack growth by presenting an interface between two materials, e.g., the EBC and the bond coat or the bond coat and the substrate, across which the crack would be required to grow. In effect, the features segregate the substrate and EBC into a plurality of smaller domains. Crack growth may occur within individual domains, but the features hinder crack growth between adjacent domains.

In some embodiments, the features may be formed in a first array at a first location and in a second array at a second location. The pattern of the first array, the pattern of the second array, the first location and the second location may be selected based on a prediction of the thermal or mechanical stress that the substrate will experience at the first location and the second location, respectively. For example, the substrate may experience higher temperatures, more severe temperature changes, and/or have a greater likelihood of being impacted by debris at the first location than at the second location. Based on this, the pattern of the first array of features may be selected to be different than the pattern of the second array of features. For example, the first array of features may include features that are spaced more closely together, have a different shape, or include another characteristic that provides superior mechanical and/or thermal stress mitigation than the second array of features.

FIG. 1 illustrates a cross-sectional diagram of an example airfoil 12 of a turbine blade 10 on which a coating may be deposited according to the techniques of the present disclosure. Turbine blade 10 generally includes an airfoil 12 attached to a stalk (not shown). Airfoil 12 includes a leading edge 16, a trailing edge 18, a pressure sidewall 20 and a suction sidewall 14. Pressure sidewall 20 is connected to suction sidewall 14 at trailing edge 18 and leading edge 16.

Although the disclosure describes primarily features formed in a surface of a turbine blade, the techniques of the disclosure may be applied to other components of a high temperature mechanical system, such as a gas turbine engine. For example, the techniques described herein may be applied to gas turbine engine blades, vanes, blade tracks, or combustor liners.

In the embodiment illustrated in FIG. 1, turbine blade 10 also includes a first cavity 22a, a second cavity 22b, a third cavity 22c, and a fourth cavity 2d (collectively "cavities 22"). Cavities 22 may aid in cooling turbine blade 10 during operation of blade 10 by circulating relatively cool air through the interior of blade 10. In some embodiments, blade 10 may include more than four cavities 22 or fewer than four cavities 22.

Turbine blade 10, and more specifically airfoil 12, may also include a plurality of trailing edge exit slots 24. At least one of trailing edge exit slots 24 is fluidly connected to fourth cavity 22d. Trailing edge exit slots 24 provide an exit for the relatively cool air that flows through fourth cavity 22d.

Airfoil 12 further includes a plurality of film cooling holes 26. First film cooling hole 26a is in fluid communication with first cavity 22a, while second film cooling hole 26b and third film cooling hole 26c are in fluid communication with second cavity 22b and third cavity 22c, respectively. In some embodiments, the plurality of film cooling holes 26 may be located proximate to the tip of blade 10. In other embodiments, the plurality of film cooling holes 26 may be arrayed throughout at least a portion of the length of airfoil 12. In some embodiments, airfoil 12 may include more than three film cooling holes 26.

As described briefly above, turbine blade 10 may be a component of a high temperature mechanical system, such as a gas turbine engine. When used in a high temperature mechanical system, blade 10 may experience high temperatures and/or may be prone to recession due to water vapor attack. Thus, turbine blade 10 may include a protective coating that reduces or substantially eliminates the effects of water vapor attack or attack by other environmental species on blade 10. For example, leading edge 16, trailing edge 18, pressure sidewall 20 and suction sidewall 14 may be coated with an EBC, which is a ceramic coating that provides environmental protection and, optionally, thermal insulation for exterior surfaces of blade 10.

The EBC may define an outer surface of airfoil 12, and thus may be exposed to gases passing through the gas turbine engine. The gases may sometimes include debris, which may impact the EBC as the gases pass through the gas turbine engine and by airfoil 12. The debris may impact the EBC, inducing cracks or other damage to the EBC. In some embodiments the cracks or damage to the EBC may eventually lead to delamination of a portion of the EBC, exposing a portion of the underlying bond coat or substrate. Without the protection of the EBC, the exposed portion of the underlying bond coat or substrate may be harmed by environmental species present in the gases passing through the gas turbine engine. For example, water vapor may cause recession of the bond coat or substrate.

As described above, airfoil 12 may experience varying temperatures that lead to thermal stress on the EBC or at an interface of the EBC and the underlying substrate or bond coat. These thermal stresses may also lead to crack formation and growth at or above the interface of the EBC and the substrate or bond coat.

In accordance with aspects of the disclosure, airfoil 12 may include a layer formed on a substrate. The layer may include three-dimensional features formed therein, which function to segregate the layer and the EBC into a plurality of smaller domains. In some embodiments, the layer may comprise the bond coat, while in other embodiments, the layer may comprise a material contained in the substrate, such as a matrix material of a ceramic matrix composite (CMC). The features may comprise, for example, grooves, depressions, ridges, protrusions, or the like.

Figure 2:
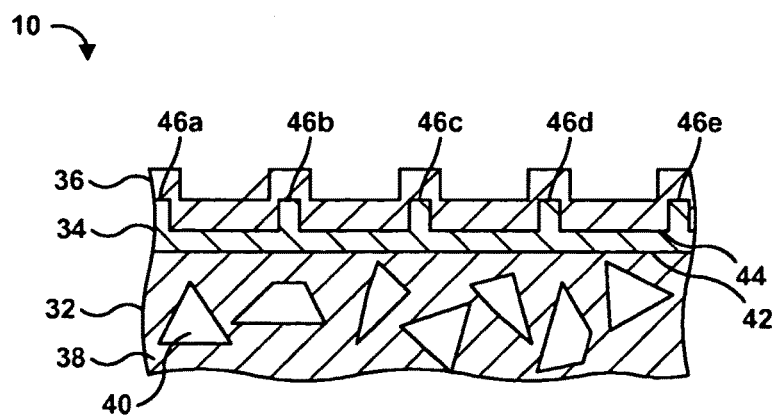
FIG. 2 is a cross-sectional diagram illustrating an example of a substrate coated with a layer, in which features are formed, and on which an environmental barrier coating is formed.

FIG. 2 is a cross-sectional diagram of a portion of an example of a gas turbine blade, such as gas turbine blade 10 shown in FIG. 1. Turbine blade 10 includes a substrate 32, a layer 34 formed on substrate 32, and an EBC 36 formed on layer 34.

Substrate 32 may include a ceramic or ceramic matrix composite (CMC). In embodiments in which substrate 32 includes a ceramic, the ceramic may be substantially homogeneous and may include substantially a single phase of material. In some embodiments, a substrate 32 comprising a ceramic may include, for example, a silicon-containing ceramic, such as silica ($SiO_2$), silicon carbide (SiC) or silicon nitride ($Si_3N_4$), alumina ($Al_2O_3$), aluminosilicate, or the like. In other embodiments, substrate 32 may include a metal alloy that includes silicon, such as a molybdenum-silicon alloy (e.g., $MoSi_2$) or a niobium-silicon alloy (e.g., $NbSi_2$).

In embodiments in which substrate 32 includes a CMC, substrate 32 may include a matrix material 38 and a reinforcement material 40. Matrix material 38 may include a ceramic material, including, for example, silicon carbide, silicon nitride, alumina, aluminosilicate, silica, or the like. The CMC may further include any desired reinforcement material 40, and reinforcement material 40 may include a continuous reinforcement or a discontinuous reinforcement. For example, reinforcement material 40 may include discontinuous whiskers, platelets, or particulates. As other examples, reinforcement material 40 may include a continuous monofilament or multifilament weave.

The composition, shape, size, and the like of reinforcement material 40 may be selected to provide the desired properties to substrate 32. For example, reinforcement material 40 may be chosen to increase the toughness of a brittle matrix material 38. Reinforcement material 40 may also be chosen to modify a thermal conductivity, electrical conductivity, thermal expansion coefficient, hardness, or the like of substrate 32.

In some embodiments, the composition of reinforcement material 40 may be the same as the composition of matrix material 38. For example, a matrix material 38 comprising silicon carbide may surround a reinforcement material 40 comprising silicon carbide whiskers. In other embodiments, reinforcement material 40 may include a different composition than the composition of matrix material 38, such as aluminosilicate fibers in an alumina matrix, or the like. One composition of substrate 32 includes a reinforcement material 40 comprising silicon carbide continuous fibers embedded in a matrix material 38 comprising silicon carbide.

Some example CMCs which may be used for substrate 32 include composites of SiC or $Si_3N_4$ and silicon oxynitride or silicon aluminum oxynitride, and oxide-oxide ceramics, such as a matrix material 38 alumina or aluminosilicate and a reinforcement material 40 comprising NEXTEL™ Ceramic Oxide Fiber 720 (available from 3M Co., St. Paul, Minn.).

In some embodiments, it may be desirable to ensure that the reinforcement material 40 is not exposed at a surface of substrate 32. In such embodiments, a layer 34 may be formed on a surface 42 of substrate 32. Layer 34 may increase the likelihood that substantially none of reinforcement material 40 is exposed at a surface 44 in which features 46 are formed.

In some embodiments, layer 34 may include the same material as matrix material 38 of substrate 32. Layer 34 may include, for example, silicon carbide, silicon nitride, alumina, silica, or the like. In this way, layer 34 may serve to increase a thickness of substrate 32 and provide a kind of buffer layer of matrix material 38 above reinforcement material 40 in substrate 32. In some embodiments, layer 34 may be formed on surface 42 of substrate 32 during formation of substrate 32. In other embodiments, layer 34 may be formed on surface 42 of substrate 32 in a separate manufacturing step.

In other examples, layer 34 may include a different material than matrix material 38 of substrate 32. For example, layer 34 may be a bond coat, which serves to increase adhesion between substrate 32 and EBC 36. When comprising a bond coat, layer 34 may include a ceramic or other material that is compatible with substrate 32. For example, layer 34 may include mullite (aluminum silicate, $Al_6Si_2O_{13}$), silica, silicides, silicon, or the like. Layer 34 may further include other ceramics, such as rare earth silicates including silicates of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium) La (lanthanum), Y (yttrium), and Sc (scandium). Some preferred compositions of a layer 34 functioning as a bond coat include silicon, mullite, and ytterbium silicate. The particular composition of layer 34 may be based on a number of considerations, including the chemical composition and phase constitution of substrate 32 and EBC 36.

EBC 36 may include any material which protects layer 34 and substrate 32 from environmental degradation. For example, EBC 36 may include materials that are resistant to oxidation or water vapor attack, and/or provide at least one of water vapor stability, chemical stability and environmental durability to substrate 32. EBC 36 may include, for example, glass ceramics such as barium strontium alumina silicate ($BaO_x$—$SrO_{1-x}$—$Al_2O_3$-$2SiO_2$; BSAS), barium alumina silicate ($BaO$—$Al_2O_3$-$2SiO_2$; BAS), calcium alumina silicate ($CaO$—$Al_2O_3$-$2SiO_2$; CAS), strontium alumina silicate ($SrO$—$Al_2O_3$-$2SiO_2$; SAS), lithium alumina silicate ($Li_2O$—$Al_2O_3$-$2SiO_2$; LAS) and magnesium alumina silicate ($2MgO$-$2Al_2O_3$-$5SiO_2$; MAS); rare earth silicates or the like. EBC 36 may be applied by a variety of techniques, such as plasma spraying, physical vapor deposition (PVD), including electron beam physical vapor deposition (EB-PVD) and directed vapor deposition (DVD), chemical vapor deposition (CVD), cathodic arc deposition, slurry dipping, sol-gel coating, electrophoretic deposition and the like, and at least a portion of EBC 36 may be deposited as a substantially non-porous structure, which reduces the likelihood or substantially prevents water vapor or other gases from contacting substrate 32. In some embodiments, EBC 36 may comprise a thickness between about 0.001 inch and about 0.1 inch. In some preferred embodiments, EBC 36 may comprise a thickness between about 0.003 inch and about 0.05 inch.

In the embodiment illustrated in FIG. 2, five features 46a, 46b, 46c, 46d, and 46e (collectively "features 46") are formed in a surface 44 of layer 34. Features 46 may comprise grooves, ridges, depressions or protrusions formed in surface 44, and may be formed by, for example, ultrasonic machining, water jet machining, mechanical machining, chemical etching, photolithography, laser machining, laser cladding, electrochemical machining, electro-discharge machining, micromachining, vibropeening, or the like. In the example shown in FIG. 2, features 46 comprise ridges or protrusions formed on surface 44 of layer 34.

Each of the features 46 disrupts the relative planarity of surface 44, e.g., each of features 46 forms a discontinuity in surface 44. Features 46 may impede crack growth in EBC 36 in a plane parallel to surface 44. While not wishing to be bound by any particular theory, features 46 may result in an interface between layer 34 and EBC 36 across which a crack would need to propagate to grow from a portion of EBC 36 located above a plateau of surface 44 to one of features 46 formed in layer 34. The transition between dissimilar materials, e.g., layer 34 and EBC 36, may impede crack growth across the interface of the two materials, and may contain crack growth to a single domain, e.g., a portion of EBC 36 located above a plateau of layer 34 or a portion of EBC 36 located above one of features 46. Accordingly, even if a crack grows to the extent that a portion of EBC 36 delaminates from substrate 32, the portion of EBC 36 that delaminates may be limited to a portion above one of features 46 or a portion above a plateau of surface 44.

Figure 3:
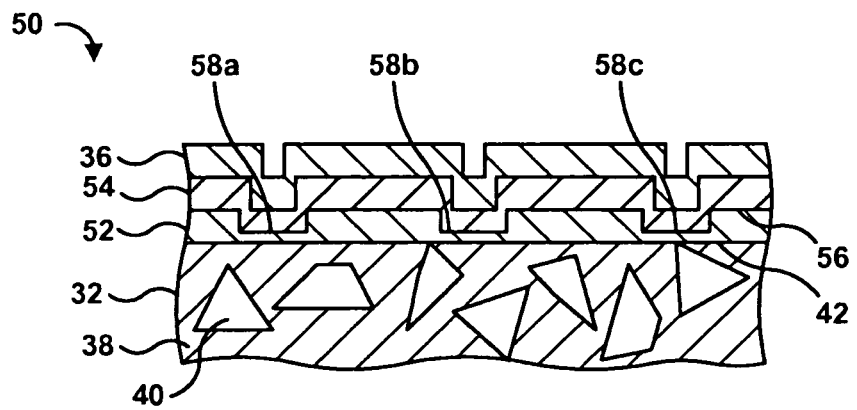
FIG. 3 is a cross-sectional diagram depicting an example of a substrate coated with an overlayer, in which features are formed and on which a bond coat is formed, and an environmental barrier coating formed on the bond coat.

In some embodiments, an article, such as gas turbine blade 10, may include at least one additional layer not shown in FIG. 2. For example, as illustrated in FIG. 3, a gas turbine blade 50 may include substrate 32, a overlayer 52 formed on surface 42 of substrate 32, a bond coat 54 formed on surface 56 of overlayer 52, and EBC 36 formed on bond coat 54.

As describe above with respect to FIG. 2, substrate 32 may in some embodiments comprises a CMC including a matrix material 38 and a reinforcement material 40. Matrix material 38 may include a ceramic material, including, for example, silicon carbide, silicon nitride, alumina, aluminosilicate, silica, or the like. In some embodiments, the composition of reinforcement material 40 may be the same as the composition of matrix material 38. For example, a matrix material 38 comprising silicon carbide may surround a reinforcement material 40 comprising silicon carbide whiskers. In other embodiments, reinforcement material 40 may include a different composition than the composition of matrix material 38, such as aluminosilicate fibers in an alumina matrix, or the like. One composition of substrate 32 includes a reinforcement material 40 comprising silicon carbide continuous fibers embedded in a matrix material 38 comprising silicon carbide.

Overlayer 52 may comprise the same composition as matrix material 38 of substrate 32. For example, overlayer 52 may comprise silicon carbide, silicon nitride, alumina, aluminosilicate, silica, or the like. In this way, overlayer 52 may serve to increase a thickness of substrate 32 and provide a kind of buffer layer of matrix material 38 above reinforcement material 40 in substrate 32. In some embodiments, overlayer 52 may be formed on surface 42 of substrate 32 during formation of substrate 32. In other embodiments, overlayer 52 may be formed on surface 42 of substrate 32 in a separate manufacturing step.

Bond coat 54 may comprise a material that improves adhesion between overlayer 52 and EBC 36. Bond coat 54 may include a ceramic or other material that is compatible with overlayer 52. For example, bond coat 54 may include mullite, silica, silicides, silicon, or the like. Bond coat 54 may further include other ceramics, such as rare earth silicates including silicates of Lu, Yb, Tm, Er, Ho, Dy, Tb, Gd, Eu, Sm, Pm, Nd, Pr, Ce, La, Y, and Sc. Some preferred compositions of bond coat 54 include silicon, mullite, and ytterbium silicate. The particular composition of bond coat 54 may be based on a number of considerations, including the chemical composition and phase constitution of overlayer 52 and EBC 36.

In the example illustrated in FIG. 3, features 58a, 58b, 58c (collectively "features 58") comprise depressions or grooves formed in surface 56 of overlayer 52. Features 58 may be formed by ultrasonic machining, water jet machining, mechanical machining, chemical etching, photolithography, laser machining, laser cladding, electrochemical machining, electro-discharge machining, micromachining, vibropeening, or the like.

Figure 4:
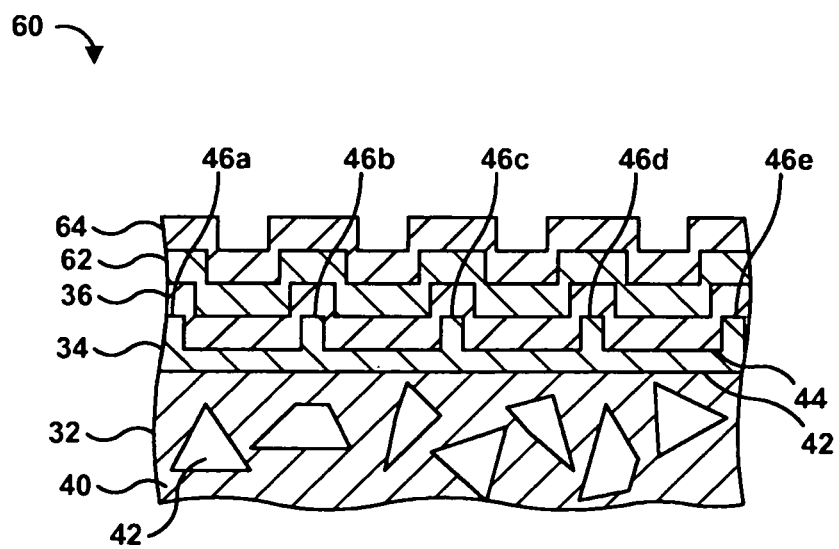
FIG. 4 is a cross-sectional diagram illustrating an example of an article including a substrate, a layer including features formed therein formed on the substrate, an environmental barrier coating formed on the layer, a thermal barrier coating formed on the environmental barrier coating, and a calcia-magnesia-aluminum-silica resistant layer formed on the thermal barrier coating.

FIG. 4 is a cross-sectional diagram of another example of a gas turbine blade 60, which includes additional layers formed over EBC 36. Gas turbine blade 60 includes a substrate 32, a layer 34 formed on surface 42 of substrate 32, an EBC 36 formed on surface 44 of layer 34, a thermal barrier coating (TBC) 62 formed on EBC 36, and a calcia-magnesia-alumina-silicate (CMAS) resistant layer 64 formed on TBC 62. While TBC 62 and CMAS resistant layer 64 are illustrated as being utilized together, some embodiments may include TBC 62 and not CMAS resistant layer 64, or may include CMAS resistant layer 64 and not TBC 62.

TBC 62 may include at least one of a variety of materials having a relatively low thermal conductivity, and may be formed as a porous or a columnar structure in order to further reduce thermal conductivity of TBC 62 and provide thermal insulation to substrate 32. In some embodiments, TBC 62 may include, for example, yttria-stabilized zirconia, yttria-stabilized hathia, a rare earth oxide-stabilized zirconia, a rare earth oxide-stabilized hafnia, a rare earth silicate, a zirconate, a hafnate, or combinations thereof.

Yttria-stabilized zirconia includes zirconia ($ZrO_2$) mixed with a minority amount of yttrium oxide ($Y_2O_3$). For example, one yttria-stabilized zirconia composition includes zirconia stabilized by about 7 wt. % to about 8 wt. % yttrium oxide. In some embodiments, yttria-stabilized zirconia may further include another rare earth oxide.

Rare earth oxides used in TBC 62 include, for example, oxides of Lu, Yb, Tm, Er, Ho, Dy, Gd, Tb, Eu, Sm, Pm, Nd, Pr, Ce, La, Y, Sc, and combinations thereof. The same rare earth elements may also be useful when present as rare earth silicates, rare earth oxide-stabilized zirconia, rare earth oxide-stabilized hafnia, rare earth hafnates, or rare earth zirconates. TBC 62 may be applied by any useful technique, including, for example, plasma spraying, PVD such as DVD or EB-PVD, CVD, and the like.

Regardless of whether the coating includes TBC 62, a CMAS resistant layer 64 may be provided adjacent to or overlying TBC 62 or EBC 36 to protect TBC 62 and/or EBC 36 from infiltration of CMAS into pores of TBC 62 and/or EBC 36. CMAS resistant layer 64 may react with any CMAS present on the coating and form a reaction layer (not shown). CMAS resistant layer 64 and the reaction layer may form a barrier to reduce or prevent the infiltration of CMAS into the pores of TBC 62 and/or EBC 36. CMAS resistant layer 64 may be applied to TBC 62 or EBC 36 using any useful method including, for example, plasma spraying, physical vapor deposition, chemical vapor deposition and the like.

CMAS resistant layer 64 may include any element that reacts with CMAS to form a solid or a highly-viscous reaction product (i.e., a reaction product that is a solid or highly viscous at the temperatures experienced by gas turbine engine 60). The reaction product may have a melting temperature significantly higher than CMAS (e.g., higher than about 1200-1250° C.). A solid or highly viscous reaction product is desired because CMAS resistant layer 64 is consumed as it reacts with CMAS to form the reaction layer. If, for example, the reaction product of CMAS resistant layer 64 and CMAS was a relatively low viscosity liquid, the low viscosity liquid could infiltrate pores of EBC 36 and/or TBC 62 once CMAS resistant layer 64 is consumed by the reaction.

If the reaction product is a solid or highly viscous, however, the reaction layer will form on the surface of CMAS resistant layer 64, which will lower the reaction rate of the CMAS with CMAS resistant layer 64. That is, once a solid or highly viscous reaction layer forms on the surface of CMAS resistant layer 64, the reaction between CMAS resistant layer 64 and CMAS will slow, because any further reaction will require the diffusion of CMAS through the reaction layer to encounter CMAS resistant layer 64, or diffusion of a component of CMAS resistant layer 64 through the reaction layer to encounter the CMAS. In either case, the diffusion of either CMAS or the component of CMAS resistant layer 64 is expected to be the limiting step in the reaction once a solid reaction layer is formed on the surface of CMAS resistant layer 64, because diffusion will be the slowest process.

CMAS resistant layer 64 includes at least one rare earth oxide. Useful rare earth oxides include oxides of rare earth elements, including, for example, Sc, Y, La, Ce, Pr, Nd, Pm, Sm, Eu, Gd, Tb, Dy, Ho, Er, Tm, Yb, Lu, and combinations thereof. In some embodiments, CMAS resistant layer 64 is essentially free of zirconia and hafnia. That is, in these embodiments, the coating includes at most trace amounts of zirconia and hafnia, such as, for example, the amounts present in commercially-available rare earth oxides.

CMAS resistant layer 64 may also include alumina and/or silica in addition to the at least one rare earth oxide. For example, CMAS resistant layer 64 may include alumina and at least one rare earth oxide, silica and at least one rare earth oxide, or alumina, silica, and at least one rare earth oxide. Alumina and/or silica may be added to CMAS resistant layer 64 to tailor one or more properties of CMAS resistant layer 64, such as, for example, the chemical reactivity of the layer 64 with CMAS, the viscosity of the reaction products, the coefficient of thermal expansion, the chemical compatibility of the layer 64 with EBC 36 or TBC 62, and the like.

Further, in some embodiments, CMAS resistant layer 64 may optionally include other additive components, such as, for example, $Ta_2O_5$, $TiO_2$, $HfSiO_4$, alkali oxides, alkali earth oxides, or mixtures thereof. The additive components may be added to CMAS resistant layer 64 to modify one or more desired properties of the layer 64. For example, the additive components may increase or decrease the reaction rate of CMAS resistant layer 64 with CMAS, may modify the viscosity of the reaction product from the reaction of CMAS and CMAS resistant layer 64, may increase adhesion of CMAS resistant layer 64 to TBC 62 or EBC 36, may increase or decrease the chemical stability of CMAS resistant layer 64, or the like.

While FIGS. 2-4 illustrate examples including different combinations of layers formed on substrate 32, the combinations of layers shown are not exclusive. For example, a CMAS resistant layer 64 may be formed on EBC 36 instead of TBC 62, or an article may include an overlayer 52, a bond coat 54, an EBC 36, and a TBC 62. Other combinations of layers are also contemplated and are covered by this disclosure.

Figure 5A:
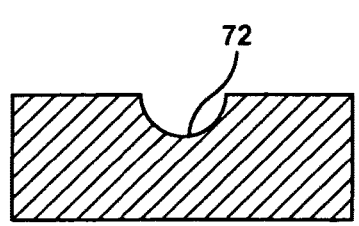
FIGS. 5A-5H are cross-sectional diagrams illustrating examples of features formed in a layer.
Figure 5B:
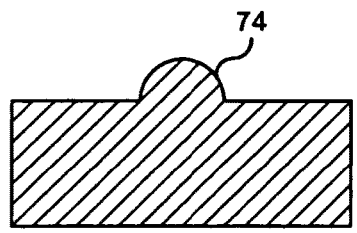
Figure 5C:
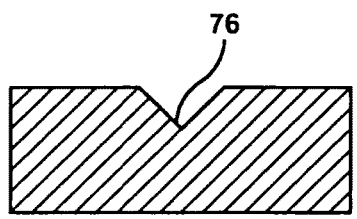
Figure 5D:
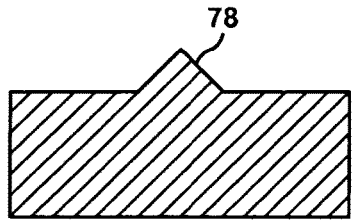
Figure 5E:
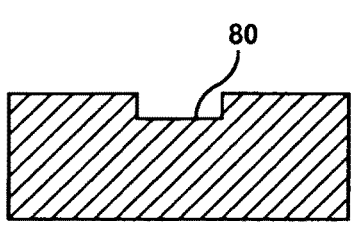
Figure 5F:
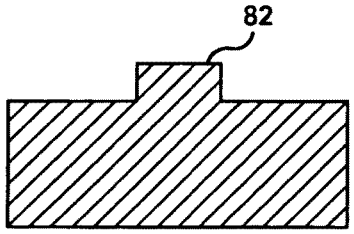
Figure 5G:
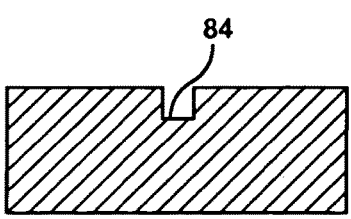
Figure 5H:
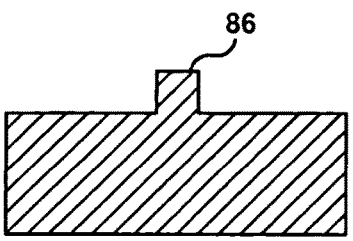

FIGS. 2-4 illustrate features 46, 58 having a generally rectangular cross sectional profile. In other embodiments, features 46, 58 may include other cross-sectional profiles. Some examples of other cross-sectional profiles of features 46, 58 are shown in FIGS. 5A-5H. For example, FIGS. 5A and 5B show a depression or groove 72 and a protrusion or ridge 74, respectively, including a generally curved cross-sectional profile (e.g., groove or ridge having a cross-section of a portion of a circle, or depression or protrusion having a shape of a portion of a sphere). FIGS. 5C and 5D illustrate a depression or groove 76 and a protrusion or ridge 78, respectively, including a triangular cross-sectional profile. For example, a depression 76 or protrusion 78 may comprise a conical shape or a pyramidal shape. FIGS. 5E and 5F illustrate a depression or groove 80 and a protrusion or ridge 82, respectively, having a generally rectangular cross-sectional profile. Finally, FIGS. 5G and 5H show a depression or groove 84 and a protrusion or ridge 86, respectively, having a generally square cross-sectional profile. Such cross-sectional profiles are merely examples; other cross-sectional profiles are also possible and will be apparent to those of ordinary skill in the art. Generally, features 72, 74, 76, 78, 80, 82, 84, 86 may include a width of less than or substantially equal to 0.1 inch, and a depth or height less than or substantially equal to a thickness of EBC 36 (see, e.g., FIG. 2).

Figure 6A:
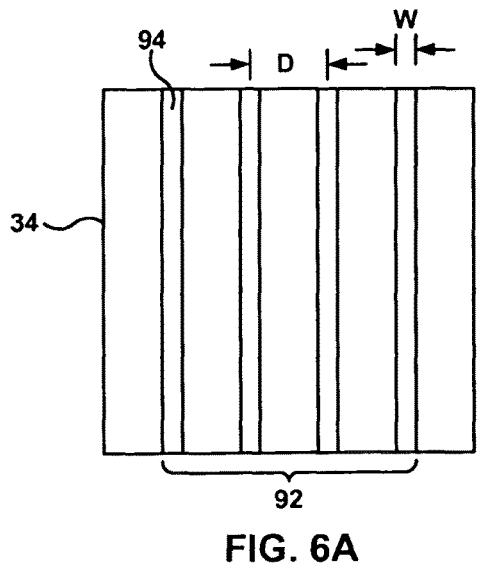
FIGS. 6A-6G are conceptual diagrams illustrating examples of layers in which arrays of features are formed.

Features 46, 58, 72, 74, 76, 78, 80, 82, 84, 86 (collectively "features 46") may be formed in layer 34 in an array comprising a plurality of features 46. FIGS. 6A-6F illustrate a number of exemplary features 46 and arrays of features 46. For example, FIG. 6A shows formed in layer 34 an array of features 92 including a plurality of grooves or ridges 94. Grooves or ridges 94 are oriented substantially parallel to each other. Such an arrangement may segregate layer 34 (and an EBC 36 formed on layer 34) into a plurality of domains, each domain being located between adjacent grooves 94. As described above, this may improve thermal or mechanical stress resistance of EBC 36 formed on layer 34.

In some embodiments, grooves 94 may be about the same width W, as shown in FIG. 6A. In other embodiments, one or more grooves 94 may be a different width W than another of grooves 94. In some embodiments, a width W of each of grooves 94 may be less than or substantially equal to 0.1 inch. In other embodiments, the width W of each of grooves 94 may be between about 0.004 inches and about 0.040 inches.

Adjacent grooves 94 may be spaced substantially evenly, or may be spaced different distances apart. The distance D between adjacent grooves 94 may be referred to as pitch, and in some embodiments, may be as great as about 1 inch. In some embodiments, the pitch is between about 0.05 inch and about 0.25 inch. In some embodiments, the pitch may increase or decrease monotonically. In other embodiments, the pitch may increase and then decrease or may decrease and then increase. In yet other embodiments, as illustrated in FIG. 6A, the pitch may be approximately constant.

Grooves or ridges 94 may have a variety of cross-sectional shapes, including, for example, an arcuate (i.e, portion of a circle), rectangular, or triangular cross-section, as illustrated in FIGS. 2-4 and 5A-5H. Each of grooves 94 may have the same cross-sectional profile, or at least one of grooves 94 may have a different cross-sectional profile than another one of grooves 94. The depth of each of grooves 94 may be as great as a thickness of EBC 36 (see. e.g., FIG. 2). In some embodiments, the depth of each of grooves 94 may be between about 20% and about 80% of a thickness of EBC 36. In terms of absolute dimensions, in some embodiments, the depth of each of grooves may be between about 0.0002 inch and about 0.1 inch. In other embodiments, the grooves may be between about 0.0006 inch and about 0.04 inch. Similar to the width W, the depth of each of grooves 94 may be approximately the same or the depth of at least one of grooves 94 may be different than at least one other of grooves 94. In some embodiments, the depth of grooves 94 may increase or decrease monotonically, may increase and then decrease, or decrease and then increase.

Figure 6B:
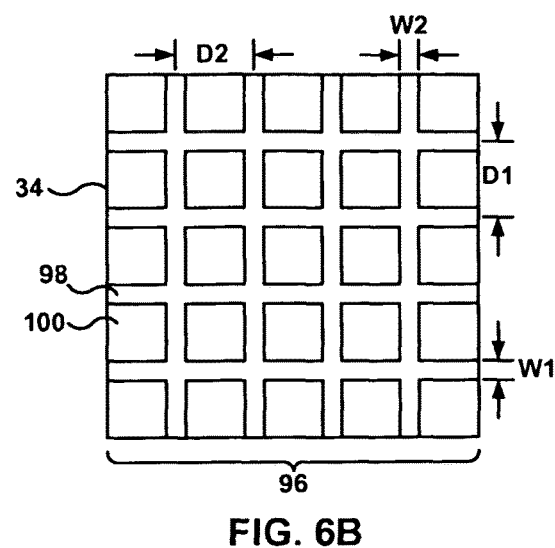

FIG. 6B illustrates an array of features 96 that includes a grid 98 formed by a first plurality of grooves or ridges formed substantially parallel to each other and a second plurality of grooves or ridges formed substantially parallel to each other and substantially perpendicular to the first plurality of grooves or ridges. When grid 98 comprises grooves, grid 98 forms a depression in layer 34 and defines a plurality of plateaus 100 in layer 34. Alternatively, when grid 98 comprises ridges, grid 98 forms a protrusion in layer 34 and defines a plurality of plateaus 100 in layer 34. In this way, grid 98 segregates layer 34 (and EBC 36 formed on layer 34) into a plurality of domains and impedes cracks from growing from one domain to an adjacent domain.

Figure 6C:
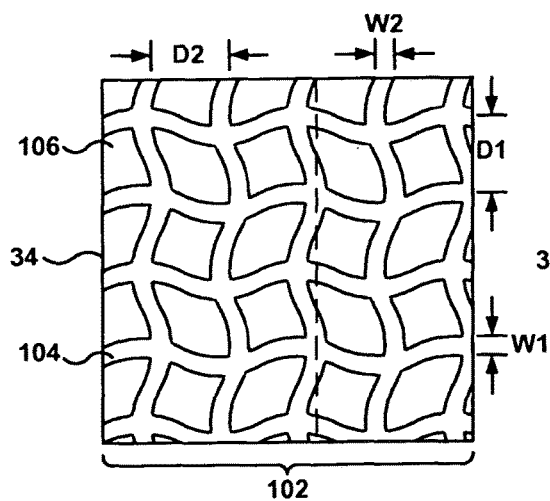

In other embodiments, as illustrated in FIG. 6C, an array of features 102 may include a grid of sinusoidal grooves or ridges 104. Grid 102 forms a depression or protrusion in layer and defines a plurality of plateaus 106 in layer 34. In this way, grid 104 segregates layer 34 (and EBC 36) into a plurality of domains and impedes cracks from growing from one domain to an adjacent domain.

In some embodiments, each of the grooves or ridges oriented substantially horizontally in FIGS. 6B and 6C may have a first width W1, and each of the grooves or ridges oriented substantially vertically in FIGS. 6B and 6C may have a second width W2. In some embodiments, first width W1 may be the same as second width W2, while in other embodiments first width W1 may be different than second width W2. In addition, in some embodiments the width of at least one vertically oriented groove or ridge in grid 98 or 104 may be different than the width of another vertically oriented groove or ridge in grid 98 or 104. Similarly, the width of at least one horizontally oriented groove or ridge in grid 98 may be different than the width of another horizontally oriented groove or ridge in grid 98 or 104. In some embodiments, the width of horizontally or vertically oriented grooves or ridges in grid 98 may increase or decrease monotonically, while in other embodiments, the width of horizontally or vertically oriented grooves or ridges in grid 98 or 104 may increase and then decrease or decrease and then increase. The width (W1 or W2) of each of the grooves or ridges in grid 98 or 104 may be less than or substantially equal to 0.1 inch. In other embodiments, the width (W1 or W2) of each of the grooves or ridges in grid 98 or 104 may be between about 0.004 inches and about 0.040 inches.

Adjacent parallel grooves or ridges in grid 98 or 104 may be spaced approximately evenly apart, or may be spaced different distances apart. In some embodiments, the distance D1 or D2 between adjacent grooves or ridges in grid 98 or 104 (referred to as pitch) may be less than or substantially equal to 1 inch. In some embodiments, the distance D1 or D2 may be between about 0.05 inch and about 0.25 inch. In some embodiments, the pitch may increase or decrease monotonically. In other embodiments, the pitch may increase and then decrease or may decrease and then increase. In yet other embodiments, as illustrated in FIGS. 6B and 6C, the pitch may be approximately constant. In addition, in some embodiments the distance D1 between adjacent grooves or ridges in a first direction may be different than the distance D2 between adjacent grooves or ridges in a second direction. In some examples, the pitch in one direction may increase or decrease within grid 98, while the pitch in a second direction may be approximately constant.

Each of the grooves or ridges in grid 98 or 104 may have a variety of cross-sectional shapes, including, for example, an arcuate, rectangular, or triangular cross-section, as illustrated in FIGS. 2-4 and 5A-5H. Each of the grooves or ridges in grid 98 or 104 may have the same cross-sectional profile, or at least one of the grooves or ridges in grid 98 or 104 may have a different cross-sectional profile than another one of the grooves or ridges in grid 98 or 104. The depth or height of each of the grooves or ridges, respectively, may be less than or substantially equal to a thickness of EBC 36. In some embodiments, the depth or height of each of the grooves or ridges, respectively, may be between about 20% and about 80% of a thickness of EBC 36. In terms of absolute dimensions, in some embodiments, the depth of each of grooves may be between about 0.0002 inch and about 0.1 inch. In other embodiments, the grooves may be between about 0.0006 inch and about 0.04 inch. Similar to the width W, the depth or height of each of the grooves or ridges in grid 98 or 104 may be approximately the same or the depth or height of at least one of the grooves or ridges may be different than at least one other of the grooves or ridges. The depth or height of the grooves or ridges may increase or decrease monotonically, or may increase and then decrease or decrease and then increase. In some examples, the depth or height of the grooves or ridges oriented in a first direction, e.g., substantially vertically in FIGS. 6B and 6C, may be different than the depth or height of the grooves or ridges oriented in a second direction, e.g., substantially horizontally in FIGS. 6B and 6C. In addition, the depth or height of the grooves or ridges oriented in one direction may change within grid 58, while the depth or height of grooves or ridges oriented in a second direction within grid 58 may be approximately constant.

Figure 6D:
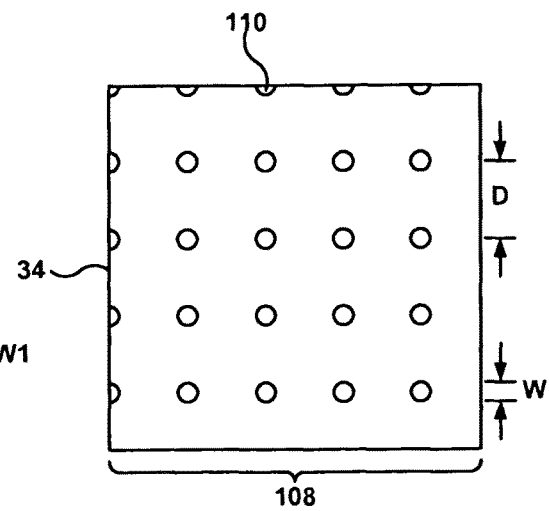
Figure 6E:
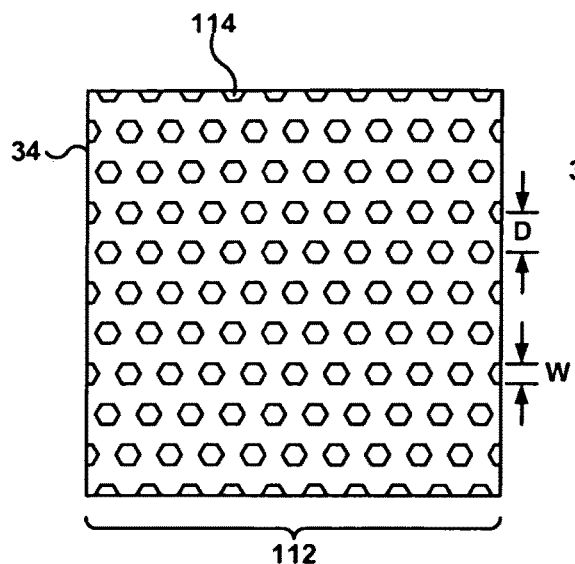
Figure 6F:
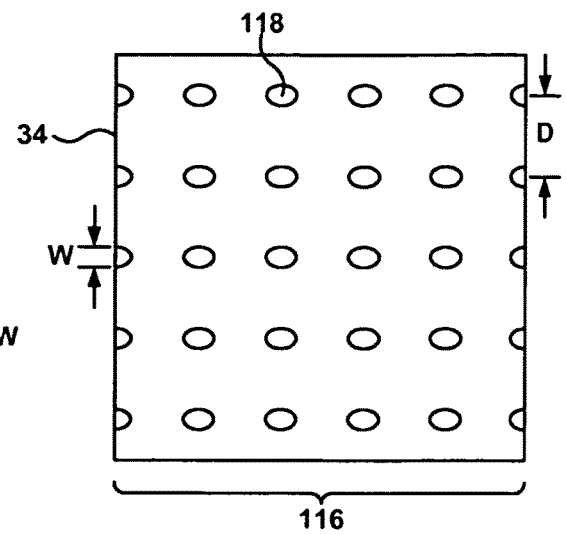

In some embodiments, layer 34 may include an array of discrete features instead of an array of substantially continuous features. For example, FIG. 6D illustrates an array of features 108 that includes a plurality of circular depressions or protrusions 110 formed in layer 34. Similarly, FIG. 6E illustrates an array of features 112 that includes a plurality of hexagonal depressions or protrusions 114 formed in layer 34 and FIG. 6F illustrates an array of features 116 that includes a plurality of elliptical depressions or protrusions 118 formed in layer 34. The illustrated patterns and shapes of depressions or protrusions 110, 114, 118 (collectively "depressions or protrusions 110") are merely examples, and other patterns and shapes of depressions or protrusions 110 are contemplated by the disclosure. In addition, an array of features may include depressions or protrusions 110 of different shapes, such as circular, hexagonal, or elliptical shapes (see FIG. 9D).

As described above, each of depressions or protrusions 110 may have a diameter or width W. In some embodiments, as shown in FIGS. 6D-6F, the diameter or width W of depressions or protrusions 110 may be substantially constant. In some embodiments, the diameter or width W of depressions or protrusions 110 may increase or decrease monotonically, while in other embodiments, the diameter or width W of depressions or protrusions 110 may increase and then decrease or decrease and then increase. The diameter or width W of each of depressions or protrusions 110 may be between less than or substantially equal to 0.1 inch. In some embodiments, the diameter or width W of each of depressions or protrusions 110 may be between about 0.004 inches and about 0.040 inches.

Depressions or protrusions 110 may be spaced approximately evenly apart, or may be spaced different distances apart, similar to the grooves or ridges in grid 98 illustrated in FIG. 6B. The distance D between adjacent depressions or protrusions 110 may be less than or substantially equal to 1 inch. In some embodiments, the distance D between adjacent depressions or protrusions 110 may be between about 0.05 inch and about 0.25 inch. The pitch may increase or decrease monotonically, may increase and then decrease, may decrease and then increase, or may be approximately constant. In addition, the distance D between adjacent depressions or protrusions 110 in a first direction may be different than the distance D between adjacent depressions or protrusions 110 in a second direction. In some examples, the pitch in one direction may increase or decrease, while the pitch in a second direction may be approximately constant. In other examples, the pitch in two substantially perpendicular directions may each change, e.g., increase in both directions, decrease in both directions, or increase in a first direction and decrease in a second direction.

Each of depressions or protrusions 110 may have one of a variety of cross-sectional shapes, including, for example, an arcuate, rectangular, or triangular cross-section, as illustrated in FIGS. 2-4 and 5A-5H. The cross-sectional profiles of each of depressions or protrusions 110 may be the same or may be different within an array of features 108, 112, or 116. The depth of each of depressions or protrusions 110 may less than or substantially equal to a thickness of EBC 36. In some embodiments, the depth of each of depressions or protrusions 110 may be between about 20% and about 80% of a thickness of EBC 36. In terms of absolute dimensions, in some embodiments, the depth of each of grooves may be between about 0.0002 inch and about 0.1 inch. In other embodiments, the grooves may be between about 0.0006 inch and about 0.04 inch. In addition, the depth of depressions or protrusions 110 within an array of features 108, 112, or 116 may be approximately the same or the depth of at least one of the depressions or protrusions 110 may be different than at least one other of the depressions or protrusions 110. The depth of the depressions or protrusions 110 may increase or decrease monotonically, may increase and then decrease, or decrease and then increase. In some embodiments, the depth of the depressions or protrusions 110 may change along one direction within an array of features 108, 112, or 116, while the depth of depressions or protrusions 110 may or may not change along a second, substantially perpendicular direction within the array of features 108, 112, or 116.

Figure 6G:
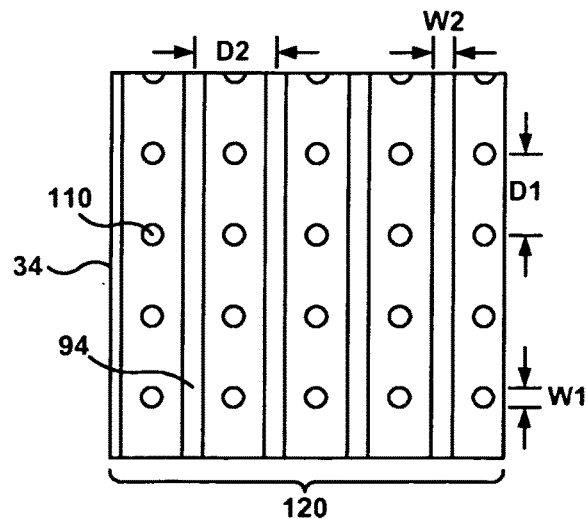

Although substantially continuous features, such as grooves or ridges 94, and discrete features, such as circular depressions or protrusions 110 have been described separately, in some embodiments, continuous and discrete features may be utilized together. For example, FIG. 6G shows an array of features 120 including a plurality of grooves or ridges 94 and a plurality of circular depressions or protrusions 110. Grooves or ridges 94 are oriented substantially parallel to each other and are formed in layer 34 between columns of depressions or protrusions 110. Such an arrangement may segregate layer 34 into a plurality of domains, each domain being located between adjacent grooves. As described above, this may improve thermal or mechanical stress resistance of EBC 36 formed on layer 34.

Depressions or protrusions 110 and grooves or ridges 94 may have characteristics, including depth or height, pitch, width, and/or cross-sectional profile similar to those described above. In some examples, depressions and ridges or grooves and protrusions may be formed together in layer 34. Other combinations of depressions, protrusions, grooves, and ridges are also contemplated by the disclosure.

Although the arrays of features shown in FIGS. 6A-6G are illustrated and described as being substantially uniform, in some embodiments, an array of features may be non-uniform or random. For example, one or more characteristic of the features in an array may be varied substantially randomly throughout the array. For example, at least one of a shape, cross-sectional profile, size, pitch, depth, or the like may be varied substantially randomly throughout the array.

Figure 7:
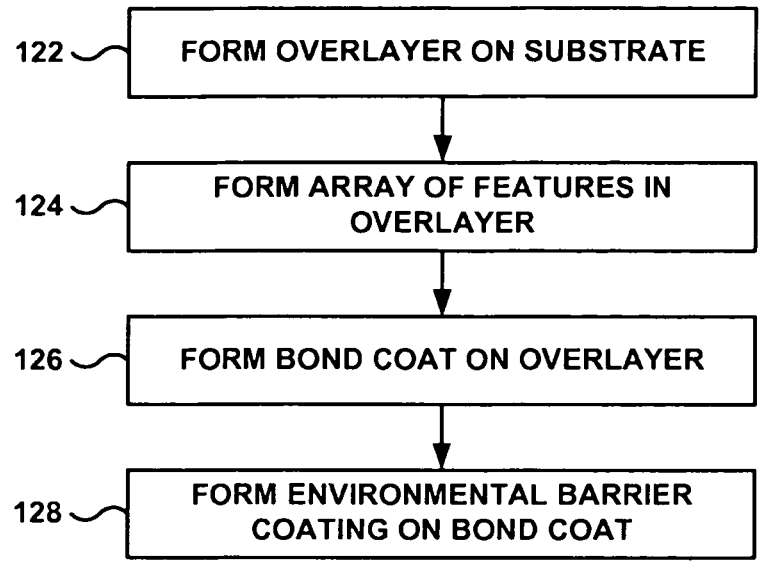
FIG. 7 is a flow diagram of an exemplary technique for forming an article including a substrate, an overlayer formed on the substrate, an array of features formed in the overlayer, and a bond coat and environmental barrier coating formed on the overlayer and the array of features.

FIG. 7 is a flow diagram of an exemplary technique of forming an article including forming on a substrate an overlayer having a plurality of features formed therein. For the sake of clarity, the technique of FIG. 7 will be described with reference to gas turbine blade 50 shown in FIG. 3, but it will be understood that the technique of FIG. 7 may be utilized on another component of a high temperature mechanical system, such as, for example, a turbine blade track, a turbine seal segment, an airfoil, or the like.

Initially, an overlayer 52 is formed on substrate 32 (122). Overlayer 52 comprises the same material as matrix material 38 of substrate 32. Overlayer 52 may be formed on substrate 32 during formation of substrate 32, or may be formed on substrate 32 in a subsequent deposition step. When formed on substrate 32 during formation of substrate 32, overlayer 52 may be deposited by, for example, chemical vapor infiltration, chemical vapor deposition, melt infiltration, polymer precursor process or the like. Formation of overlayer 52 may include depositing an additional amount of matrix material 38 once reinforcement material 40 is covered to ensure substantial complete encapsulation of reinforcement material 40.

When formed on substrate 32 after formation of substrate 32, overlayer 52 may be deposited by, for example, CVD, polymer precursor process, sol-gel process, slurry process, plasma spraying, PVD, or the like. As described above, overlayer 52 may be formed to comprise a thickness greater than a depth or height of features 58 formed in overlayer 52, to increase a likelihood or ensure that reinforcement material 40 is not exposed when the features are formed in overlayer 52.

Once overlayer 52 has been formed on substrate 32 (122), an array of features 58 is formed in overlayer 52 (124). The array may include a plurality of features 58, such as, for example, linear grooves or ridges, sinusoidal grooves or ridges, a grid formed by linear or sinusoidal grooves or ridges, circular depressions or protrusions, hexagonal depressions or protrusions, elliptical depressions or protrusions, rectangular depressions or protrusions, or combinations of these features 58. When features 58 include depressions or grooves, the features 58 may be formed by, for example, ultrasonic machining, water jet machining, mechanical machining, chemical etching, photolithography, laser machining, electrochemical machining, electro-discharge machining, micromachining, vibropeening, or the like. In chemical etching and photolithography, portions of overlayer 52 are exposed to a chemical that reacts with overlayer 52 to remove material from overlayer 52. By controlling the locations that are etched by the chemical and the amount of time for which overlayer 52 is exposed to the chemical, the depth and shape of the features 58 may be controlled. The locations that are etched may be controlled by covering portions of overlayer 52 that are not to be etched with a layer of material that is inert with respect to the chemical etchant.

In laser machining, a source of electromagnetic energy, such as an excimer laser, is used to generate a series of electromagnetic pulses of a wavelength that is absorbed by overlayer 52. The intensity of the pulses is sufficient to cause portions of overlayer 52 that absorb the energy to vaporize. Sequential exposure of different portions of overlayer 52 may be used to vaporize a portion or portions of overlayer 52 and form features 58.

Other methods of forming features 58 may include mechanical removal of portions of overlayer 52 by, for example, a pressurized stream of water, an abrasive, water carrying an abrasive, or a tool that is sufficiently hard to deform overlayer 52 or remove material from overlayer 52.

In embodiments in which features 58 comprise ridges or protrusions, features 58 may be formed by, for example, laser cladding. In laser cladding, a laser or other electromagnetic energy source is focused onto an area of material deposited on overlayer 52 to melt or sinter the material and form features 58. By controlling the location and movement of the laser and the added material relative to overlayer 52, laser cladding may be used to form the desired shape of features 58 on overlayer 52.

Once the array of features 58 is formed in the overlayer 52 (124), a bond coat 54 optionally may be deposited on layer 52, including the array of features 58 (126). As described above, bond coat 54 may include a material that improves adhesion between overlayer 52 and EBC 36. Bond coat 54 may include a ceramic or other material that is compatible with overlayer 52. For example, bond coat 54 may include mullite, silica, silicides, silicon, a rare earth silicate, or the like. Bond coat 54 may be formed on layer 52 by, for example, plasma spraying, PVD, CVD, slurry dipping or the like. Bond coat 54 may substantially reproduce the geometry of layer 52, including features 58.

After the optional deposition of bond coat 54, EBC 36 may be formed on bond coat 54 (or if bond coat 54 is not present, on layer 52) (128). EBC 36 may include any material which protects layer 52 and substrate 32 from environmental degradation. For example, EBC 36 may include materials that are resistant to oxidation or water vapor attack, and/or provide at least one of water vapor stability, chemical stability and environmental durability to substrate 32. EBC 36 may include, for example, glass ceramics such as BSAS, BAS, CAS, SAS, LAS and MAS; rare earth silicates or the like. EBC 36 may be applied by a variety of techniques, such as plasma spraying, PVD such as EB-PVD or DVD, CVD, cathodic arc deposition, slurry dipping, sol-gel coating, electrophoretic deposition and the like, and may be deposited as a substantially non-porous structure for at least a portion of the coating, which reduces the likelihood or substantially prevents water vapor or other gases from contacting substrate 32. EBC 36 substantially reproduces features 58.

Figure 8:
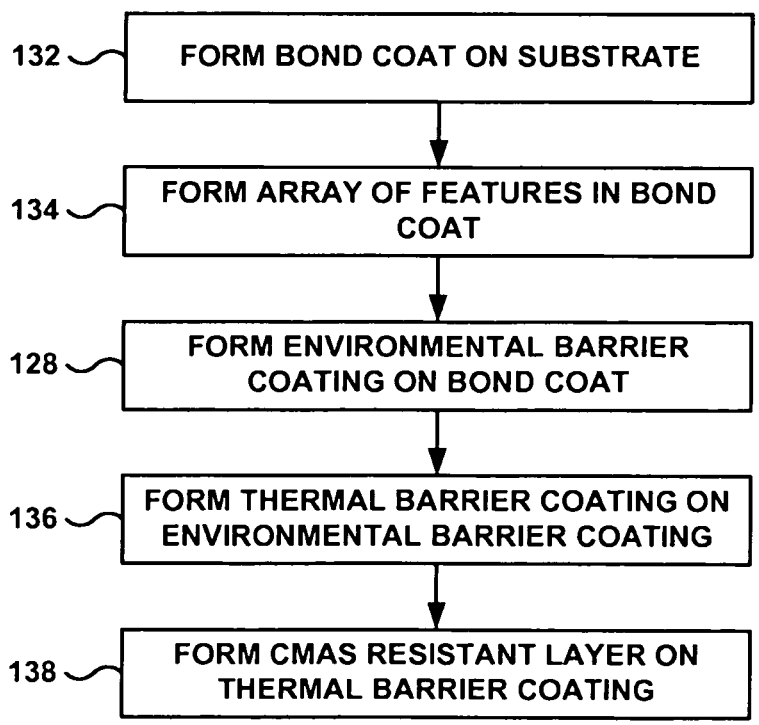
FIG. 8 is a flow diagram of an exemplary technique for forming an article including a substrate, a bond coat formed on the substrate, an array of features formed in the bond coat, and an environmental barrier coating formed on the bond coat and the array of features.

In some embodiments, instead of forming an overlayer 52 on substrate 32 and forming features 58 in the overlayer 52, a bond coat 54 may be formed directly on substrate 32 and features 46 may be formed in bond coat 54 (see FIG. 2 and accompanying description). FIG. 8 is a flow diagram of an example technique for forming such an article.

Initially, bond coat 54 is formed on substrate 32 (132). Bond coat 54 may include a material that improves adhesion between substrate 32 and EBC 36, such as, for example, a metal or a ceramic. For example, bond coat 54 may include mullite, silica, silicides, silicon, a rare earth silicate, or the like. Bond coat 54 may be formed on substrate 32 by, for example, plasma spraying, PVD, CVD, or the like.

Once bond coat 54 has been formed on substrate 32 (132), an array of features 46 is formed in bond coat 54 (134). The array may include a plurality of features 46, such as, for example, linear grooves or ridges, sinusoidal grooves or ridges, a grid formed by linear or sinusoidal grooves or ridges, circular depressions or protrusions, hexagonal depressions or protrusions, elliptical depressions or protrusions, rectangular depressions or protrusions, or combinations of these features 46. When features 46 include depressions or grooves, the features 46 may be formed by, for example, ultrasonic machining, water jet machining, mechanical machining, chemical etching, photolithography, laser machining, electrochemical machining, electro-discharge machining, micromachining, vibropeening, or the like. When features 46 comprise ridges or protrusions, features 46 may be formed by, for example, laser cladding.

Once the array of features 46 has been formed in bond coat 54 (134), EBC 36 is formed on bond coat 54 and over the array of features (128). EBC 36 may include any material which protects bond coat 54 and substrate 32 from environmental degradation such as, for example, glass ceramics such as BSAS, BAS, CAS, SAS, LAS and MAS; rare earth silicates or the like. EBC 36 may be applied by a variety of techniques, such as plasma spraying, PVD such as EB-PVD or DVD, CVD, cathodic arc deposition, slurry dipping, sol-gel coating, electrophoretic deposition and the like, and may be deposited as a substantially non-porous structure for at least a portion of the coating, which reduces the likelihood or substantially prevents water vapor or other gases from contacting substrate 32. EBC 36 substantially reproduces features 46 formed in bond coat 54. In this way, a plurality of domains are formed in EBC 36, which serve to prevent crack propagation within EBC 36 and improve mechanical and/or thermal stress tolerance of EBC 36.

In some embodiments, a TBC 62 (FIG. 4) optionally may be formed on EBC 36 (136). As described above, TBC 62 may include at least one of a variety of materials having a relatively low thermal conductivity, and may be formed as a porous or a columnar structure in order to increase the strain tolerance and/or further reduce thermal conductivity of TBC 62 and provide thermal insulation to substrate 32. In some embodiments, TBC 62 may include, for example, yttria-stabilized zirconia, yttria-stabilized hafnia, a rare earth oxide-stabilized zirconia, a rare earth oxide-stabilized hafnia, a rare earth silicate, a rare earth zirconate, a rare earth hafnate, or combinations thereof. TBC 62 may be deposited on EBC 36 by any useful technique, including, for example, plasma spraying, PVD such as DVD or EB-PVD, CVD, and the like.

In some embodiments, regardless of whether TBC 62 was formed on EBC 36, a CMAS-resistant layer 64 may be deposited over EBC 36 (138) (i.e., directly on EBC 36 if TBC 62 is not present, or on TBC 62, if present). CMAS resistant layer 64 may be provided adjacent to or overlying TBC 62 or EBC 36 to protect TBC 62 and/or EBC 36 from infiltration of CMAS into pores of TBC 62 and/or EBC 36.

CMAS resistant layer 64 may include any element that reacts with CMAS to form a solid or a highly-viscous reaction product (i.e., a reaction product that is a solid or highly viscous at the temperatures experienced by gas turbine engine 60). The reaction product may have a melting temperature significantly higher than CMAS (e.g., higher than about 1200-1250° C.). For example, CMAS resistant layer 64 includes at least one rare earth oxide. Useful rare earth oxides include oxides of rare earth elements, including, for example, Sc, Y, La, Ce, Pr, Nd, Pm, Sm, Eu, Gd, Tb, Dy, Ho, Er, Tm, Yb, Lu, and combinations thereof. In some embodiments, CMAS resistant layer 64 is essentially free of zirconia and hafnia. That is, in these embodiments, the coating includes at most trace amounts of zirconia and hafnia, such as, for example, the amounts present in commercially-available rare earth oxides. In some embodiments, CMAS resistant layer 64 may optionally include alumina, silica, $Ta_2O_5$, $TiO_2$, $HfSiO_4$, an alkali oxide, and/or an alkali earth oxide.

CMAS resistant layer 64 may be applied to TBC 62 or EBC 36 using any useful method including, for example, plasma spraying, physical vapor deposition, chemical vapor deposition and the like.

While the foregoing description has been primarily directed to forming a single array of features in a layer on a CMC substrate, other techniques may be used to improve thermal and/or mechanical stress resistance of an article. For example, an article may include a first array of features formed in a first location of a substrate and a second array of features formed in a second location in the substrate. Each of the first and second locations may be selected based on thermal and/or mechanical stresses that the first and second locations are predicted to experience during use. The predicted thermal and/or mechanical stresses may be determined based on experimental data, e.g., data collected from previously used or tested components, or may be predicted by theoretical modeling (e.g., finite element analysis) of thermal stresses on the component.

For example, FIGS. 9A-9D are conceptual diagrams illustrating various examples of first and second arrays of features formed in a layer 34 of an article based on predicted thermal and/or mechanical stresses experienced at first and second locations of the article. FIG. 9A illustrates a layer 34 having a first array 146 of features 114 formed in a first location 142 of layer 34 and a second array 148 of features 114 formed in a second location 144 of layer 34. In the embodiment illustrated in FIG. 9A, each of the features 114 comprises a hexagonal depression. In other embodiments, each of the features 114 may include depressions of another shape, protrusions of any shape, linear or sinusoidal grooves, and/or linear or sinusoidal ridges.

In some embodiments, the predicted thermal and/or mechanical stress at first location 142 may be greater than the predicted thermal and/or mechanical stress at second location 144. The thermal and/or mechanical stresses experienced by first location 142 and second location 144, respectively, may be due to temperature changes, which cause thermal expansion and/or contraction of layer 34 and an EBC (not shown in FIG. 9A) formed on layer 34, or may be due to physical impacts of debris with the EBC. First location 142 may experience greater thermal and/or mechanical stress due to, for example, the position of first location 142 within a high temperature mechanical system, while second location 144 may experience lesser thermal stress because of its position within the high temperature mechanical system.

Accordingly, first location 142 may have formed therein a first array 146 of features 114, which may provide greater thermal and/or mechanical stress mitigation than second array 148 of features 114 formed in second location 144. For example, in the embodiment illustrated in FIG. 9A, features 114 in first array 146 are formed in a more closely spaced pattern than features 114 in second array 148. Such a pattern divides layer 34 into smaller domains, and may better mitigate thermal and/or mechanical stress than the larger spacing of features 114 in second array 148. Second array 148 may still provide thermal and/or mechanical stress mitigation to second location 144 of layer 34.

Although features 114 in FIG. 9A are depicted as being uniform in size and shape, in some embodiments a single array 146 or 148 may include a pattern of features 114 including more than one shape, size, and/or depth. An example of arrays including different shapes is illustrated in FIG. 9D. In some embodiments, the size, shape, and/or depth of features 114 may monotonically increase in one or two perpendicular dimensions within an array 146 or 148, or may increase and then decrease in one or two perpendicular dimensions within an array 146 or 148. Additionally, in some embodiments, an array 146 and/or 148 may include a non-uniform or random distribution of features 114 within the array 146 and/or 148.

As FIG. 9B illustrates, in some embodiments layer 34 may include a transitional region 154, which includes a transitional array 160 of features 114. Transitional region 154 is located between a first location 152, which includes a first array 158 of features 114, and a second location 156, which includes a second array 162 of features 114. Within transitional array 160, the spacing, or pitch, between adjacent features 114 may change substantially continuously from the spacing of features 114 in first array 158 to the spacing of features 114 in second array 162.

For example, to transition from first array 158 to second array 162, each subsequent row within transitional array includes fewer features 114, and an increased spacing between adjacent features 114 within the row. In this way, transitional array may smooth the transition from first array 158 to second array 162. Transitional array 160 may provide thermal and/or mechanical stress mitigation that is intermediate between first array 158 and second array 162, and changes as the features 114 or spacing of features 114 within transitional array 160 changes. For example, the thermal stress mitigation provided by transitional array 160 may be greater proximate to first array 158 than the thermal stress mitigation provided by transitional array 160 proximate to second array 162.

Although FIG. 9B illustrates only the pitch of features 114 changing within transitional array 160, in other embodiments, a size, depth, or shape of features 114 may change from being similar to features 114 within first array 158 to being similar to features 114 within second array 162. In some embodiments, two or more characteristics of features 114, e.g., size, shape, depth, or pitch, may change within transitional array 160.

FIG. 9C illustrates a layer 34 including a first array 178 of features comprising parallel grooves or ridges 94 in layer 34 formed at a first location 172 of layer 34. Layer 34 also includes a second array 182 of grooves or ridges 94 formed at a second location 176 of layer 34, and a transitional array 180 of grooves or ridges 94 formed in a transitional region 174 of layer 34. First array 178 includes a first spacing between adjacent grooves or ridges 94, and second array 182 includes a second spacing between adjacent grooves or ridges 94. Transition array 180 includes spacing between adjacent grooves or ridges 94 that changes from being similar to spacing between grooves or ridges 94 in first array 178 to being similar to spacing between grooves or ridges 94 in second array 182. In this way, transitional array 180 provides a substantially continuous transition from the pattern of grooves or ridges 94 in first array 178 to the pattern of grooves or ridges 94 in second array 182.

While FIGS. 9A-9C illustrate first and second arrays of features 46 that include similar features 46, in some embodiments the first and second arrays may include different features 46, as illustrated in FIG. 9D. In FIG. 9D, layer 34 includes a first array 196 comprising hexagonal depressions or protrusions 114 and elliptical depressions or protrusions 118 formed at a first location 192 of layer 34 and a second array 198 of circular depressions or protrusions 110 formed at a second location 194 of layer 34.

First array 196 includes hexagonal depressions or protrusions 114 and elliptical depressions or protrusions 118. In other embodiments, other combinations of features may be utilized in a single array, e.g., first array 196, and more than two features may be utilized in a single array. Hexagonal depressions or protrusions 114 and elliptical depressions or protrusions 118 are shown in FIG. 9D solely as an example of one combination of features. In addition, although the pitch between adjacent features 114, 118 within first array 196 is shown as being substantially uniform, in other embodiments, the pitch may change within first array 196.

Both the pitch and the shape of features changes between first array 196 and second array 198. Once again, circular depressions or protrusions 110 are merely exemplary, and any shape of features may be used in second array 198.

In some embodiments, instead of the shape and/or pitch of features changing between first array 196 and second array 198, the shape and/or pitch of features may not change, and the size and/or depth of features may change between first array 196 and second array 198. In fact, any combination of characteristics of features, e.g., size, shape, pitch, depth, cross-sectional shape, or the like, may change or may not change between first array 196 and 198.

Although not depicted in FIGS. 9A-9D, in some embodiments, a first array of features may include substantially continuous features (e.g., grooves 94 of FIG. 6A), while a second array of features includes discrete features (e.g., circular depressions or protrusions 110 of FIG. 6D). Other combinations of features and arrays of features will be apparent to those of skill in the art.

Additionally and optionally, in some embodiments, the construction of the layers formed over substrate 32 may be different in a first location (e.g., first location 192) and a second location (e.g., second location 194). For example, in a location of an article that is predicted to experience lower thermal stress, a TBC may not be utilized, and the article may include a coating including an overlayer 52, a bond coat 54, and an EBC 36. On the other hand, in a location of an article that is predicted to experience greater thermal stress, a TBC may be utilized in addition to overlayer 52, bond coat 54, and EBC 36. Of course, other combinations of layers may be used, as described throughout this disclosure. In some embodiments, more than two layer constructions may be utilized in a single article. The layer construction may be selected in combination with the arrays of features to provide tailored thermal and/or mechanical stress mitigation at different locations of a single article.

Figure 10:
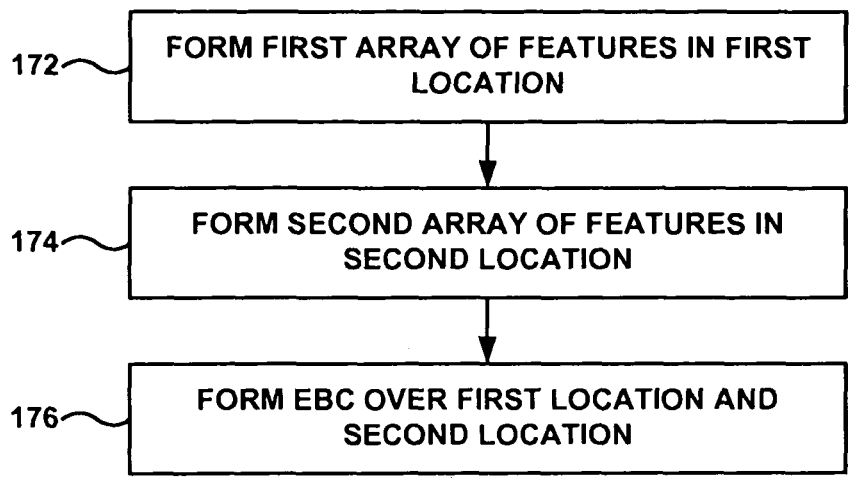
FIG. 10 is a flow diagram of an exemplary technique of forming an article including a first array of features in a first location and a second array of features in a second location.

FIG. 10 is a flow diagram of an exemplary technique for forming an article including a first array of features in a first location of an article and a second array of features in a second location of the article. The technique of shown in FIG. 10 will be described with reference to FIG. 9A for the sake of convenience, but will be understood to be applicable to other embodiments including a first array and second array of features formed in a layer.

Initially, a first array 146 of features is formed in a first location 142 on a layer 34 (172). The features may include hexagonal depressions or protrusions 114, as illustrated in FIG. 9A, or may include, for example, linear grooves or ridges, sinusoidal grooves or ridges, a grid formed by linear or sinusoidal grooves or ridges, circular depressions or protrusions, elliptical depressions or protrusions, or combinations of these features. The features may be formed by, for example, ultrasonic machining, water jet machining, mechanical machining, chemical etching, photolithography, laser machining, laser cladding, electrochemical machining, electro-discharge machining, micromachining, vibropeening, or the like.

As described above, first location 142 may be selected or determined based on a prediction of thermal and/or mechanical stress that the article that includes layer 34 will experience during use. The prediction of thermal and/or mechanical stress may be made based on experimental evidence or data, such as data collected during use of a similar layer under similar condition to those which layer 34 (and substrate 32) will experience. In some embodiments, the prediction of thermal and/or mechanical stress may be made based on theoretical stress calculations based on material properties of substrate 32, layer 34, bond coat 54 (if present, see FIG. 3), and/or EBC 36 (see FIG. 2) (e.g., finite element analysis).

Once first array 146 is formed in layer 34 (172), second array 148 of features (e.g., hexagonal depressions or protrusions 114) may be formed in a second location 144 of layer 34 (174). A process similar to that used to form first array 146 may be used to form second array 148. In some embodiments, second array 148 may be formed substantially simultaneously with first array 146. In other embodiments, second array 148 may be formed after first array 146.

Similar to first location 142, second location 144 may be selected or determined based on a prediction of thermal and/or mechanical stress that the article that includes layer 34 will experience during use. The prediction of thermal stress may be made based on experimental evidence or data, such as data collected during use of a similar layer under similar condition to those which layer 34 (and substrate 32) will experience. In some embodiments, the prediction of thermal and/or mechanical stress may be made based on theoretical stress calculations based on material properties of substrate 32, layer 34, bond coat 54 (if present, see FIG. 3), and/or EBC 36 (see FIG. 2) (e.g., finite element analysis).

As described above, first array 146 and second array 148 may include first and second patterns of features, respectively. The patterns may be defined by a shape, size, depth, pitch, or cross-sectional profile of the features. In some embodiments, only one of these characteristics may change between first array 146 and second array 148, while in other embodiments, two or more of these characteristics may change between first array 146 and second array 148. Additionally or alternatively, in some embodiments, at least one of first array 146 and second array 148 may include a non-uniform or random distribution of features.

Although not shown in FIG. 10, in some embodiments the technique may optionally include forming a transitional array (e.g., transitional array 160, FIG. 9B) in layer 34. As described above, the transitional array may include a pattern which transitions from being similar to the pattern in first array 146 proximate to first array 146 and being similar to second array 148 proximate to second array 148. The transitional array may be formed by any of the processes used to form first array 146 and/or second array 148. In some embodiments, the transitional array may be formed substantially simultaneously with first array 146 and/or second array 148. In other embodiments, transitional array may be formed sequentially with first array 146 and/or second array 148.

Once first array 146, second array 148 and, optionally, the transitional array have been formed in layer 34, an EBC 36 (FIG. 2) may be formed on layer 34, including features in first array 146 and second array 148 (176). As described above, EBC 36 may include any material which protects layer 34 and substrate 32 from environmental degradation. For example, EBC 36 may include glass ceramics such as BSAS, BAS, CAS, SAS, LAS, and MAS; rare earth silicates or the like. EBC 36 may be applied by a variety of techniques, such as plasma spraying, PVD, including EB-PVD and DVD, CVD, cathodic arc deposition, slurry dipping, sol-gel coating, electrophoretic deposition and the like, and may be deposited as a substantially non-porous structure for at least a portion of the coating.

Although the foregoing examples have been described primarily with respect to a gas turbine blade, in other examples, the techniques described herein may be applied to other components of high temperature mechanical systems. For example, a gas turbine engine blade track or a gas turbine engine blade shroud may include a CMC substrate, a layer formed over the substrate, and an array of features formed in the layer. Similarly, while the forgoing examples have been described primarily with respect to an EBC formed over the layer that includes the array of features (alone or in combination with other layers), in some examples, an abradable coating may be formed over the layer that includes the array of features.

An abradable coating may include, for example, a coating that is configured to be abraded by a second component, such as a gas turbine blade. In some examples, the abradable coating is formed with at least one porous layer, and the pores may increase the disposition of the abradable coating to break into relatively small pieces when the coating is exposed to sufficient mechanical forces, such as, for example, from contact with the second component.

In some examples, the abradable coating may provide a seal between the gas turbine engine blade track or gas turbine engine blade shroud and the gas turbine blade. For example, the relative sizes of the gas turbine engine blade track or gas turbine engine blade shroud and the gas turbine blade may be selected such that the blade may intentionally contact and abrade at least a portion of the abradable coating. In some examples, the contact between blade and shroud or track may result in formation of a groove in the abradable coating corresponding to the path of the turbine blade. The abradability of the abradable coating may allow contact between the turbine blade and abradable coating while also allowing the turbine blade to rotate relatively freely. In addition, the abradable coating may be usable as a seal in high temperature systems where rubber or other polymeric seals may degrade.

Figure 11:
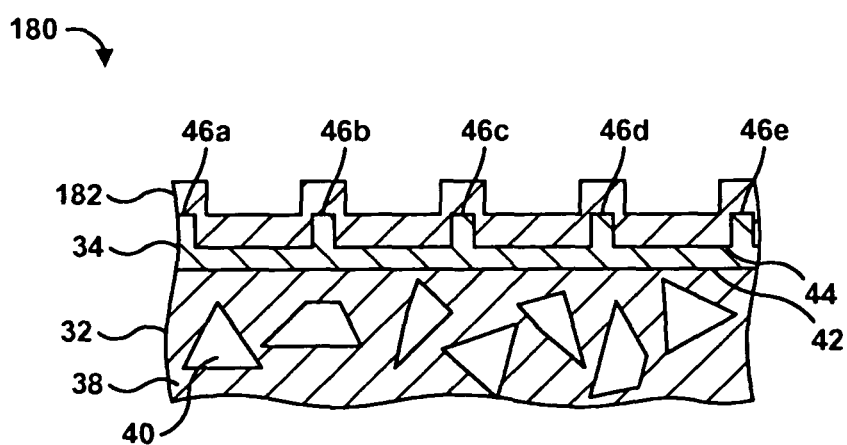
FIG. 11 is a cross-sectional diagram of an example article that includes a substrate, a layer that includes an array of features formed on the substrate, and an abradable coating formed over the layer that includes the array of features.

One example of an article that includes an abradable coating formed over a layer that includes an array of features is shown in FIG. 11. In the example depicted in FIG. 11, article 180 includes a substrate 32, a layer 34 formed on substrate 32, and an abradable coating 182 formed on layer 34. Additionally, layer 34 may include formed thereon an array of features 46.

As described above, substrate 32 may include a ceramic or CMC. In some embodiments, a substrate 32 comprising a ceramic may include, for example, a silicon-containing ceramic, such as silica ($SiO_2$), silicon carbide (SiC) or silicon nitride ($Si_3N_4$); alumina ($Al_2O_3$); aluminosilicate; or the like. In other embodiments, substrate 32 may include a metal alloy that includes silicon, such as a molybdenum-silicon alloy (e.g., $MoSi_2$) or a niobium-silicon alloy (e.g., $NbSi_2$).

In embodiments in which substrate 32 includes a CMC, substrate 32 may include a matrix material 38 and a reinforcement material 40. Matrix material 38 may include a ceramic material, including, for example, silicon carbide, silicon nitride, alumina, aluminosilicate, silica, or the like. The CMC may further include any desired reinforcement material 40, and reinforcement material 40 may include a continuous reinforcement or a discontinuous reinforcement. For example, reinforcement material 40 may include discontinuous whiskers, platelets, or particulates. As other examples, reinforcement material 40 may include a continuous monofilament or multifilament weave.

In some embodiments, the composition of reinforcement material 40 may be the same as the composition of matrix material 38. In other embodiments, reinforcement material 40 may include a different composition than the composition of matrix material 38, such as aluminosilicate fibers in an alumina matrix, or the like.

In some embodiments, it may be desirable to ensure that the reinforcement material 40 is not exposed at a surface of substrate 32. In such embodiments, a layer 34 may be formed on a surface 42 of substrate 32. Layer 34 may increase the likelihood that substantially none of reinforcement material 40 is exposed at a surface 44 in which features 46 are formed.

In some embodiments, layer 34 may include the same material as matrix material 38 of substrate 32. In other examples, layer 34 may include a different material than matrix material 38 of substrate 32. For example, layer 34 may be a bond coat, which serves to increase adhesion between substrate 32 and abradable coating 182. When comprising a bond coat, layer 34 may include a ceramic or other material that is compatible with substrate 32. For example, layer 34 may include mullite, silica, silicides, silicon, or the like. Layer 34 may further include other ceramics, such as rare earth silicates including silicates of Lu, Yb, Tm, Er, Ho, Dy, Tb, Gd, Eu, Sm, Pm, Nd, Pr, Ce, La, Y, or Sc.

Layer 34 includes features 46 that are formed in a surface 44 of layer 34. Features 46 may comprise grooves, ridges, depressions or protrusions formed in surface 44, and may be formed by, for example, chemical etching, photolithography, laser machining, laser cladding, electrochemical machining, electro-discharge machining, micromachining, vibropeening, ultrasonic machining, water jet machining, mechanical machining, or the like. In the example shown in FIG. 11, features 46 comprise ridges or protrusions formed on surface 44 of layer 34. Other examples of features that may be formed in surface 44 are illustrated in FIGS. 3-6 and 9A-9D. Additionally, examples of ranges of sizes, depths, pitch, and the like for the features 46 are described with respect to FIGS. 3-6 and 9A-9D, above.

Article 180 may further include an abradable coating 182 formed over layer 34 and features 46. Abradable coating 182 may include a material that provides at least one of erosion resistance, abradability, corrosion resistance, thermal shock resistance, manufacturability and high temperature capability. For example, abradability may include a disposition to break into relatively small pieces when exposed to a sufficient physical force. Abradability may be influenced by the material characteristics of abradable coating 182, such as fracture toughness and fracture mechanism (e.g., brittle fracture), as well as the porosity of abradable coating 182. In some examples, thermal shock resistance and high temperature capability may be important for use in a gas turbine engine, in which abradable coating 182 is exposed to wide temperature variations from high operating temperatures to low environmental temperatures when the gas turbine engine is not operating. In some examples, abradable coating 182 may include up to about 50 volume percent (vol. %) porosity, such as, for example, between about 30 vol. % and about 45 vol. % porosity.

In some examples, abradable coating 182 may include at least one rare earth silicate. The rare earth silicate may include a silicate of at least one of Lu, Yb, Tm, Er, Ho, Dy, Tb, Gd, Eu, Sm, Pm, Nd, Pr, Ce, La, Y, or Sc. The rare earth silicate may include a rare earth monosilicate, which has the chemical formula $RE_2O_3$—$SiO_2$ or, equivalently, $RE_2SiO_5$, where RE is a rare earth element, may include a rare earth disilicate, which has the formula $RE_2O_3$-$2SiO_2$ or, equivalently, $RE_2Si_2O_7$, where RE is a rare earth element, or may include a mixture of both rare earth monosilicate and rare earth disilicate. A rare earth monosilicate may be formed by a chemical reaction between one silica molecule and one rare earth oxide molecule, while a rare earth disilicate may be formed by a chemical reaction between two silica molecules and one rare earth oxide molecule.

In some embodiments, abradable coating 182 may include a mixture of rare earth monosilicate and rare earth disilicate. For example, abradable coating 182 may include a predominance of rare earth monosilicate when a rare earth oxide and silica are present in approximately a 1:1 molar ratio, but may still include some rare earth disilicate. Similarly, abradable coating 182 may include a predominance of rare earth disilicate when a rare earth oxide and silica are present in approximately a 1:2 molar ratio, but may still include some rare earth monosilicate.

In addition, abradable coating 182 may further include a silica ($SiO_2$) molecule that is not associated with a rare earth oxide molecule, a rare earth oxide molecule that is not associated with a silica molecule, or both.

In some examples, abradable coating 182 may include a first sublayer that includes or consists essentially of rare earth disilicate (e.g., may include substantially no rare earth monosilicate) and a second sublayer that includes or consists essentially of rare earth monosilicate (e.g., may include substantially no rare earth disilicate). In some examples, the second sublayer may be formed on the first sublayer. In some examples, abradable coating 182 may further include a compositionally graded transitional layer between the first sublayer and the second sublayer (e.g., a mixture of rare earth disilicate and rare earth monosilicate with a high disilicate-to-monosilicate ratio at the interface with the first sublayer and a low disilicate-monosilicate ratio at the interface with the second sublayer).

Abradable coating 182 may further include other, optional, additive elements or compounds. The additive elements or compounds may modify the mechanical and/or chemical properties of abradable coating 182, such as, for example, a coefficient of thermal expansion of abradable coating, or a chemical or mechanical compatibility of abradable coating 182 with an adjacent layer, such as layer 34. The additive elements may include, for example, alumina, $Ta_2O_5$, $TiO_2$, $HfSiO_4$, alkali oxides, alkali earth oxides, or mixtures thereof.

In some examples, as illustrated in FIG. 11, abradable layer 182 may substantially reproduce the shape of features 46 formed in layer 34. As described above, features 46 may segregate abradable layer 182 into a plurality of smaller domains. Crack growth may occur within individual domains, but features 46 hinder crack growth between adjacent domains.

Figure 12:
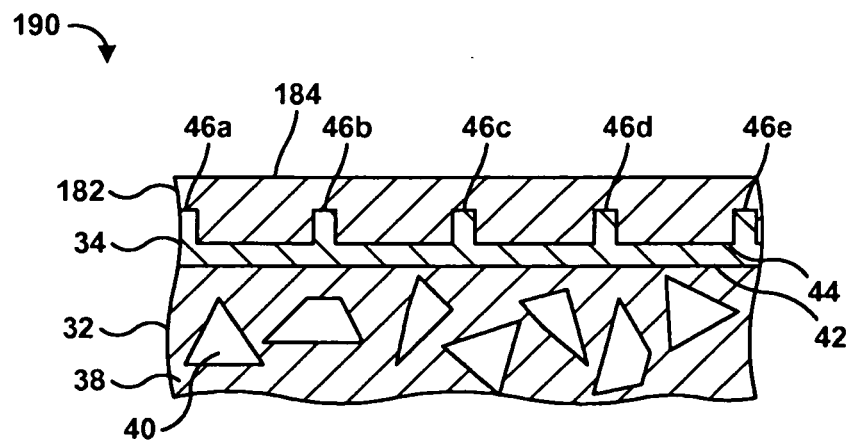
FIG. 12 is a cross-sectional diagram of an example article that includes a substrate, a layer that includes an array of features formed on the substrate, and an abradable coating formed over the layer that includes the array of features.

In other examples, as illustrated in FIG. 12, an article 190 may include an abradable layer 182 that does not substantially reproduce the shape of features 46 formed in layer 34. In some implementations, this may be preferred, as a relatively smooth surface 184 of abradable layer 182 may facilitate sealing between abradable layer 182 and a tip of a gas turbine blade, may improve aerodynamic properties of abradable layer 182, or the like. In some implementations, the smooth surface may be produced by polishing.

Figure 13:
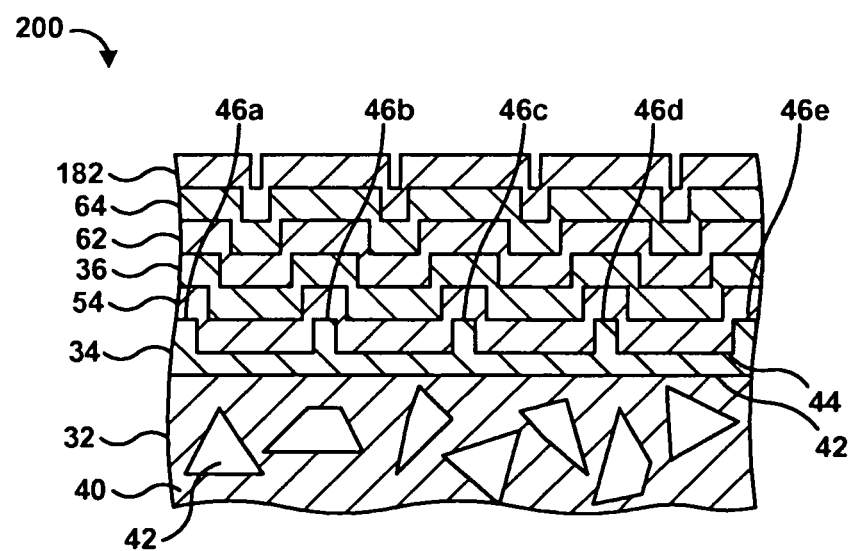
FIG. 13 is a cross-sectional diagram of an example article that includes a substrate, a layer that includes an array of features formed on the substrate, a bond coat formed on the layer that includes the array of features, an environmental barrier coating formed on the bond coat, a thermal barrier coating formed on the environmental barrier coating, a CMAS-resistant layer formed on the thermal barrier coating, and an abradable coating formed on the CMAS-resistant layer.

In some examples, an article may include other layers in combination with abradable layer 182. For example, as illustrated in FIG. 13, article 200 may include substrate 32, layer 34, and abradable layer 182. Additionally, article 200 optionally may include at least one of bond coat 54, EBC 36, TBC 62, and/or CMAS-resistant layer 64. Bond coat 54, EBC 36, TBC 62, and CMAS-resistant layer 64 may include any composition described herein, may be deposited using any suitable technique, and may be formed to any suitable thickness. Additionally, bond coat 54, EBC 36, TBC 62, and CMAS-resistant layer 64 may be formed over substrate 32 in any order. For example, EBC 36 may be formed over TBC 62, or TBC 62 may be formed over EBC 36. Other examples are also contemplated and are covered by the scope of this disclosure.

In some example, as illustrated in FIG. 13, abradable layer 182 is the outer-most layer of article 190. In other examples, another layer may form the outer-most layer of article 200, such as, for example, CMAS-resistant layer 64.

As described above with respect to FIG. 12, in some examples, abradable layer 182 may not substantially reproduce the shape of features 46, and may instead define a relatively smooth outer surface 184.

Abradable layer 182 may be deposited over or deposited directly on substrate 32, layer 34, EBC 36, TBC 62, or CMAS-resistant layer 64 using, for example, a thermal spraying technique, such as, for example, plasma spraying. Porosity of abradable layer 182 may be controlled by the use of coating material additives and/or processing techniques to create the desired porosity. In some embodiments, substantially closed pores may be desired.

For example, a coating material additive that melts or burns at the use temperatures of the component may be incorporated into the coating material that forms abradable layer 182. The coating material additive may include, for example, graphite, hexagonal boron nitride, or a polymer such as a polyester, and may be incorporated into the coating material prior to deposition of the coating material over layer 34, EBC 36, TBC 62, or CMAS-resistant layer 64 to form abradable layer 182. In some embodiments, the additive may be incorporated into the coating material during the spray powder processing of the coating material. The coating material additive then may be melted or burned off in a post-deposition heat treatment, or during operation of the gas turbine engine, to form pores in abradable layer 182. The post-deposition heat-treatment may be performed at up to about 1500° C. for a component having a substrate 32 that includes a CMC or other ceramic.

The coating material additive may be exposed to various processing techniques to improve the amount of additive that remains entrapped within abradable layer 182 after thermal spraying. In some embodiments, the coating material and coating material additive may undergo attrition ball milling to attach the particles of the coating material additive to particles of the coating material. In other embodiments, the coating material additive may be attached to the coating material with an organic binder, such as, for example, a cellular methyl carbonate, which may also contain sodium or carbon. The use or processing techniques to improve the amount of additive that remains entrapped within abradable layer 182 after thermal spraying may improve at least one of the extent of porosity and the uniformity of porosity in abradable layer 182.

The porosity of abradable layer 182 can also be created and/or controlled by plasma spraying the coating material using a co-spray process technique in which the coating material and coating material additive are fed into the plasma stream with two radial powder feed injection ports. The feed pressures and flow rates of the coating material and coating material additive may be adjusted to inject the material on the outer edge of the plasma plume using direct 90 degree angle injection. This may permit the coating material particles to soften but not completely melt and the coating material additive to not burn off but rather soften sufficiently for adherence in abradable layer 182.

In some embodiments, the porosity of abradable layer 182 may be controlled to vary throughout at least a portion of abradable layer 182. For example, the porosity of abradable layer may be controlled to be greater adjacent outer surface 184 than adjacent surface 44 of layer 34.

As described briefly above, abradable layer 182 may be deposited to a range of thicknesses depending on various considerations. One consideration may be a predicted size change of components (e.g., a turbine blade and turbine shroud or track) at a low operating temperature or temperatures when the turbine engine is not operating at a maximum operating temperature. For example, thermal expansion of a turbine blade may be expected to reduce the distance between a tip of the turbine blade and substrate 32. In this example, the thickness of abradable layer 182 may be selected to be substantially equal to or greater than the predicted difference in the distance between the blade tip and substrate 32 at low operating temperatures and high operating temperatures. This may allow contact and formation of a seal between the blade tip and blade track or blade shroud at substantially all operating temperatures, which may improve efficiency of the gas turbine engine throughout its operational temperature range.

In some embodiments, abradable layer 182 may be deposited to a thickness of up to approximately 0.1 inches (about 2.5 mm). In other embodiments, abradable layer 182 may be deposited to a thickness of approximately 0.030 to approximately 0.060 inches (approximately 0.76 mm to approximately 1.5 mm). In some embodiments, abradable layer 182 may be deposited to a thickness approximately equal to or greater than the desired final thickness and may be machined to the desired final thickness.

Figure 14:
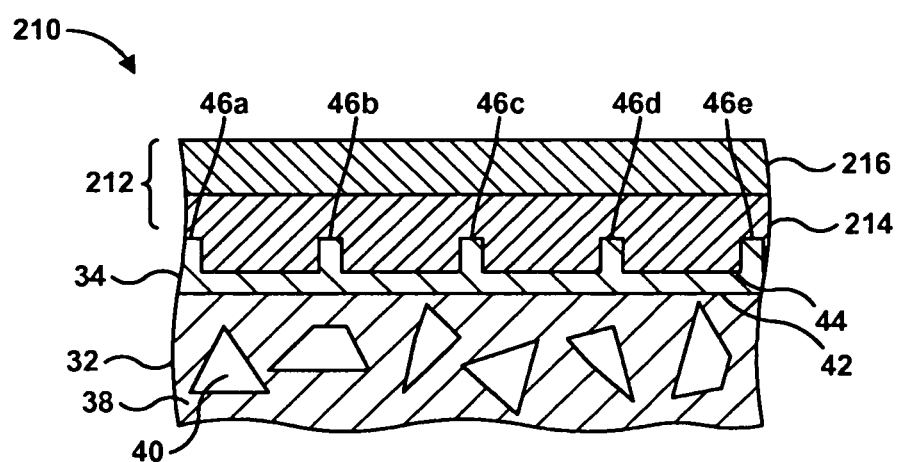
FIG. 14 is a cross-sectional diagram of an example of an article that includes a multilayer abradable coating deposited over a substrate and a layer that includes an array of features.

In some example, an article may include a multilayer abradable coating instead of a single-layer abradable coating. FIG. 14 illustrates an example of an article 210 that includes a multilayer abradable coating 212 deposited over substrate 32 and layer 34. In the embodiment illustrated in FIG. 14, multilayer abradable coating 212 includes a first layer 214 deposited over layer 34 and a second layer 216 deposited over first layer 214. First layer 214 may comprise a first material, while second layer 216 may comprise a second material different from the first material.

In other embodiments, multilayer abradable coating 212 may include more than two layers 214 and 216, such as, for example, a plurality of pairs of first layer 214 and second layer 216. For example, multilayer abradable coating 212 may include two pairs of first layer 214 and second layer 216, arranged in alternating layers (e.g., first layer 214, second layer 216, first layer 214, second layer 216). Multilayer abradable coating 212 may include any number of pairs of first layer 214 and second layer 216.

First layer 214 may include, or may consist essentially of, a rare earth silicate, similar to those described above with reference to abradable layer 182. First layer 214 may include, for example, monosilicates, disilicates, or both of at least one of Lu, Yb, Tm, Er, Ho, Dy, Tb, Gd, Eu, Sm, Pm, Nd, Pr, Ce, La, Y, Sc, and the like. In some embodiments, first layer 214 may also include at least one of silica or a rare earth oxide, which may be present in addition to the rare earth silicate. First layer 214 also may include at least one of alumina, $Ta_2O_5$, $TiO_2$, $HfSiO_4$, alkali oxides, and alkali earth oxides.

Second layer 216 may include, or may consist essentially of, stabilized zirconia or stabilized hafnia. Each of stabilized zirconia and stabilized hafnia includes the base oxide (e.g., zirconia or hafnia) stabilized by the inclusion of one or more additive elements or compounds. For example, stabilized zirconia or stabilized hafnia may include a rare earth oxide incorporated in the zirconia or hafnia. The rare earth oxide may modify or improve the phase stability, thermal conductivity, or another characteristic of the hafnia or zirconia.

While FIG. 14 illustrates second layer 216 as deposited over first layer 214, in other embodiments, second layer 216 (e.g., the layer include stabilized zirconia or stabilized hafnia) may be deposited over or deposited directly on layer 34. First layer 214 (e.g., the layer including the rare earth silicate) then may be deposited over or deposited directly on second layer 216. Once again, abradable coating 212 may include more than one layer pair of first layer 214 and second layer 216.

While various features and arrays of features formed in a surface of a substrate have been described in different embodiments, the illustrated embodiments will be understood to not limit the combinations and configurations of features and arrays or layers formed over substrate 32. For example, while different cross-sectional profiles were described primarily with respect to FIGS. 5A-5H, it will be understood that any of the features or arrays described herein may comprise any cross-sectional profile. Other combinations of features, arrays, and layers described herein will be apparent to those of skill in the art, and fall within the scope of the following claims.

Various embodiments have been described. These and other embodiments are within the scope of the following claims.

The invention claimed is:

1. An article comprising:
   a ceramic matrix composite substrate comprising a matrix material and a reinforcement material;
   a layer on the substrate, wherein the layer comprises the matrix material, and wherein the layer defines a surface and comprises an array of features in the surface;
   a bond coat on the layer and the array of features; and
   an abradable coating over the bond coat, wherein the abradable coating comprises a rare earth silicate and a porosity of between about 30 vol. % and about 45 vol. %.

2. The article of claim 1, further comprising an environmental barrier coating on the bond coat, wherein the abradable coating is on the environmental barrier coating.

3. The article of claim 1, wherein the abradable coating is on the bond coat.

4. The article of claim 1, wherein the array of features comprises an array of at least one of grooves, depressions, ridges, or protrusions.

5. The article of claim 1, wherein the array of features comprises a first feature and a second feature, and wherein a distance between the first feature and the second feature is less than about 1 inch.

6. The article of claim 1, wherein the array of features comprises at least one of a groove or a depression, and wherein a depth of the groove or the depression is less than or approximately equal to a thickness of the coating.

7. The article of claim 1, wherein the array of features comprises at least one of a ridge or a protrusion, and wherein a height of the ridge or the protrusion is less than or approximately equal to a thickness of the coating.

8. The article of claim 1, further comprising a thermal barrier coating on the bond coat, wherein the abradable coating is on the thermal barrier coating.

9. The article of claim 1, further comprising a calcia-magnesia-alumina-silicate resistant coating on the bond coat, wherein the abradable coating is on the calcia-magnesia-alumina-silicate resistant coating.

10. The article of claim 1, wherein the array of features comprises a first feature and a second feature, and wherein the first feature comprises a first characteristic and the second feature comprises a second characteristic different than the first characteristic.

11. The article of claim 10, wherein the characteristic comprises at least one of a depth, a size, or a shape.

12. The article of claim 1, wherein the array of features comprises a first feature, a second feature, a third feature, and a fourth feature, and wherein a first pitch between the first feature and the second feature is different than a second pitch between the third feature and the fourth feature.

13. The article of claim 1, wherein the array of features formed on the layer comprises:
   a first array of features formed on the layer at a first location, wherein the first array comprises a first pattern; and
   a second array of features formed on the surface of the layer at a second location, wherein the second array comprises a second pattern different than the first pattern.

14. The article of claim 13, wherein at least one of the first array of features or the second array of features comprises a first feature and a second feature, and wherein a distance between the first feature and the second feature is between about 0.05 inches and 0.25 inches.

15. The article of claim 13, wherein at least one of the first array of features or the second array of features comprises at least one of a groove or a depression, and wherein a depth of the groove or the depression is between about 20 percent and about 80 percent of a thickness of the coating.

16. The article of claim 13, wherein at least one of the first array of features or the second array of features comprises at least one of a ridge or a protrusion, and wherein a height of the ridge or the protrusion is between about 20 percent and about 80 percent of a thickness of the coating.

17. The article of claim 13, wherein at least one of the first array of features or the second array of features comprises at least one of a groove, a ridge, a depression, or a protrusion, and wherein a width of the groove, the ridge, the depression, or the protrusion is between about 0.004 inch and about 0.04 inch.

18. The article of claim 13, wherein the first pattern comprises at least one of a depth of the features, a size of the features, a pitch between the features, or a shape of the features, and wherein the second pattern comprises at least one of a depth of the features, a size of the features, a pitch between the features, or a shape of the features.

19. The article of claim 1, wherein the layer defines a thickness sufficient to ensure that none of the reinforcement material is exposed at a surface of the layer, and wherein the layer consists essentially of the matrix material.

20. The article of claim 1, wherein the bond coat comprises at least one of silicon, mullite, silica, a silicide, or a rare earth silicate.

21. A method comprising:
   forming a layer on a ceramic matrix composite substrate, wherein the ceramic matrix composite substrate comprises a matrix material and a reinforcement material, and wherein the layer comprises the matrix material and defines a surface;
   forming an array of features in the surface of the layer;
   forming a bond coat on the layer;

forming an abradable coating over the bond coat and the array of features, wherein the abradable coating comprises a rare earth silicate and a porosity of between about 30 vol. % and about 45 vol. %.

22. The method of claim 21, further comprising forming an environmental barrier coating on the bond coat, wherein forming the abradable coating comprises forming the abradable coating on the environmental barrier coating.

23. The method of claim 22, further comprising forming a calcia-magnesia-alumina-silicate resistant coating on the bond coat and the array of features, wherein forming the abradable coating comprises forming the abradable coating on the calcia-magnesia-alumina-silicate resistant coating.

24. The method of claim 21, wherein forming the abradable coating comprises forming the abradable coating on the bond coat.

25. The method of claim 21, wherein forming the array of features comprises forming an array of at least one of grooves, depressions, ridges, or protrusions.

26. The method of claim 21, further comprising forming a thermal barrier coating on the bond coat, wherein forming the abradable coating comprises forming the abradable coating on the thermal barrier coating.

27. The method of claim 21, wherein forming the array of features on the surface of the layer comprises:
    forming a first array of features in a surface of the layer at a first location, wherein the first array of features comprises a first pattern; and
    forming a second array of features in the surface of the layer at a second location, wherein the second array of features comprises a second pattern different than the first pattern.

28. The method of claim 27, wherein the first array of features comprises an array of at least one of grooves, depressions, ridges, or protrusions, and wherein the second array of features comprises an array of at least one of grooves, depressions, ridges, or protrusions.

29. The method of claim 27, wherein the first pattern comprises at least one of a depth of the features, a size of the features, a pitch between the features, or a shape of the features, and wherein the second pattern comprises at least one of a depth of the features, a size of the features, a pitch between the features, or a shape of the features.

30. The method of claim 21, wherein the bond coat comprises at least one of silicon, mullite, silica, a silicide, or a rare earth silicate.

* * * * *